(12) United States Patent
Yamasaki et al.

(10) Patent No.: US 6,177,005 B1
(45) Date of Patent: Jan. 23, 2001

(54) SYSTEM FOR PRODUCING ULTRAPURE WATER HAVING A TOC DENSITY OF NO MORE THAN 0.5 PPB

(75) Inventors: Kazuyuki Yamasaki, Hiroshima; Toyoichi Nasu, Nabari; Takahide Miyamoto, Fukuyama; Seiji Okamoto, Fukuyama; Kazuyuki Sakata, Fukuyama; Masami Sera, Fukuyama; Atsushi Yokotani, Kurashiki, all of (JP)

(73) Assignee: Sharp Kabushiki Kaisha (JP)

( * ) Notice: Under 35 U.S.C. 154(b), the term of this patent shall be extended for 0 days.

(21) Appl. No.: 09/166,519

(22) Filed: Oct. 6, 1998

(30) Foreign Application Priority Data

Oct. 9, 1997 (JP) .................................................... 9-277534

(51) Int. Cl.[7] ................................ C02F 3/06; C02F 3/30; B01D 24/00
(52) U.S. Cl. ........................ 210/150; 210/151; 210/195.1; 210/205; 210/260; 210/264; 210/274; 210/290; 210/900; 210/605; 210/614; 210/617; 210/618; 210/629; 210/681
(58) Field of Search ..................................... 210/605, 614, 210/615–618, 629, 630, 681, 739, 748, 151, 150, 195.1, 205, 260, 264, 274, 290, 900, 663, 669, 269

(56) References Cited

U.S. PATENT DOCUMENTS

| | | |
|---|---|---|
| 4,056,465 * | 11/1977 | Spector . |
| 4,444,664 * | 4/1984 | Treyssac . |
| 4,731,185 * | 3/1988 | Chen et al. . |
| 4,919,815 * | 4/1990 | Copa et al. . |
| 4,933,076 * | 6/1990 | Oshima et al. . |
| 5,062,958 * | 11/1991 | Bateson et al. . |
| 5,180,495 * | 1/1993 | Thuer et al. . |
| 5,423,988 * | 6/1995 | Yamasaki et al. . |
| 5,518,620 * | 5/1996 | Eguchi et al. . |
| 5,580,458 * | 12/1996 | Yamasaki et al. . |
| 5,632,885 * | 5/1997 | Yamasaki et al. . |

(List continued on next page.)

FOREIGN PATENT DOCUMENTS

| | | |
|---|---|---|
| 60-193596 * | 10/1985 | (JP) . |
| 6-63592 | 3/1994 | (JP) . |
| 6-233997 | 8/1994 | (JP) . |
| 7-284799 | 10/1995 | (JP) . |
| 9-70598 | 3/1997 | (JP) . |

Primary Examiner—David A. Simmons
Assistant Examiner—Fred Prince
(74) Attorney, Agent, or Firm—Nixon & Vanderhye PC

(57) ABSTRACT

Ultrapure water having a reduced amount of TOC and a low electrical conductivity is produced in correspondence with a variation in water quality of raw water. A first water tank has an anaerobic organic matter treatment chamber and an aerobic organic matter treatment chamber which are communicated with each other at their bottom portions. Activated carbon bags are arranged in upper portions of both the chambers, and Bincho charcoal is stowed in the lower portion of the chambers. With this arrangement, carbon compounds and organic nitrogen compounds in the water to be treated are biologically treated by microbes, thereby reducing the TOC. Furthermore, nitrate nitrogen generated through the organic nitrogen compound treatment process is denitrified by the anaerobic microbe, thereby reducing the electrical conductivity of the water to be treated. Both activated carbon towers perform an advanced treatment on remaining carbon compounds and remaining organic nitrogen compounds in the water to be treated from the aerobic organic matter treatment chamber. A controller controls the rate of circulation of the water to be treated and the rate of stirring of the water to be treated on the basis of a signal from a TOC meter, thereby ensuring the water quality of the water to be treated.

17 Claims, 19 Drawing Sheets

U.S. PATENT DOCUMENTS

| | | |
|---|---|---|
| 5,670,046 | * 9/1997 | Kimmel . |
| 5,676,836 | * 10/1997 | Yamasaki et al. . |
| 5,702,604 | * 12/1997 | Yamasaki et al. . |
| 5,707,514 | * 1/1998 | Yamasaki et al. . |
| 5,788,838 | 8/1998 | Yamasaki et al. . |
| 5,811,012 | * 9/1998 | Tanabe et al. . |
| 5,849,194 | * 12/1998 | Yamasaki et al. . |
| 5,868,934 | * 2/1999 | Yamasaki et al. . |
| 5,895,576 | * 4/1999 | Yamasaki et al. . |

* cited by examiner

SYSTEM FOR PRODUCING ULTRAPURE WATER HAVING A TOC DENSITY OF NO MORE THAN 0.5 PPB

BACKGROUND OF THE INVENTION

The present invention relates to an ultrapure water producing system, and in particular, to an ultrapure water producing method and ultrapure water producing system capable of producing ultrapure water having a reduced amount of TOC (Total Organic Carbon) and a low electrical conductivity.

The water quality required for ultrapure water in a semiconductor manufacturing factory has become more and more strict in accordance with the microstructural progress of semiconductor devices. Particularly in a factory for manufacturing semiconductor devices of a degree of integration higher than that of 64 Mbit-DRAM (Dynamic Random-Access Memory), the TOC is reduced to a density of not higher than 1 ppb (Parts Per Billion) in the ultrapure water.

In general, an ultrapure water producing system is constructed of a pretreatment unit, a primary pure water producing unit and a secondary pure water producing unit. Then, the pretreatment unit adopts physicochemical methods such as coagulative sedimentation, coagulative filtration and coagulative pressurized floatation. Concrete examples of such pretreatment units are shown in FIGS. 16A and 16B. The pretreatment units shown in FIG. 16A and FIG. 16B adopt the methods of sedimentation and filtration that are both physicochemical treatments and are pretreatment units intended mainly for the removal of sludge in the water to be treated. Therefore, the pretreatment units shown in FIGS. 16A and 16B cannot be regarded as a treatment system for effectively treating organic nitrogen compounds that cause an increase in TOC density.

As the above primary pure water producing unit, there is a system of a combination of a reverse osmosis unit, an ion exchange resin unit and an infrared sterilization unit. As the above secondary pure water producing unit, there is one constructed of an ultraviolet oxidation unit, an ion exchange resin unit, an ultrafiltration membrane unit and so on.

According to the recent research, it has been discovered that the remaining TOC in the ultrapure water is caused by the organic nitrogen compounds coming from raw water. In this case, "raw water" means industrial water, underground water and the like. In contrast to this, drinking water and tap water are called "city water".

In general, for the method of treating the carbon compounds and organic nitrogen compounds and the like that cause an increase in TOC density in the water to be treated, a reverse osmosis unit, a special ion exchange resin unit or an ultraviolet oxidation unit, as described above, are used. However, according to the recent demand for a water quality of a TOC density of not higher than 1 ppb in ultrapure water, a pretreatment unit has also been developed that adopts a biotic treatment method utilizing an aerobic microbe in addition to the aforementioned generic organic matter treatment system (prior art reference of Japanese Patent Laid-Open Publication No. HEI 6-63592).

In accordance with the growing consciousness of the water resources, many ultrapure water producing systems have been proposed that collect waste water and reuse the same instead of limitlessly using the city water, industrial water, underground water and the like as raw water. A method has been proposed for producing ultrapure water by mixing raw water with waste water containing several parts per million of IPA (isopropyl alcohol) and acetone that serve as organic solvents and biologically treating the organic nitrogen compounds (prior art reference of Japanese Patent Laid-Open Publication No. HEI 6-233997). According to this ultrapure water producing method, the organic nitrogen compounds in the water to be treated are treated through a biotic treatment by the pretreatment unit and thereafter treated successively by a primary pure water producing unit and a secondary pure water producing unit, finally obtaining ultrapure water having a TOC density of not higher than 1 ppb. It is to be noted that an aerobic microbe is utilized and activated carbon is used as filler for the biotic treatment in the pretreatment unit, thereby treating the organic nitrogen compounds represented by urea.

An ultrapure water producing system that performs pretreatment by means of a microbe, is shown in FIG. 17. In this ultrapure water producing system, industrial water and collected water are introduced as raw water into a water receiving tank 1. Then, after a lapse of a retention time of at least three hours, the water is introduced into an upward flow type biotic decomposition unit 3 by a conveying pump 2. This upward flow type biotic decomposition unit 3 is stowed with activated carbon or the like, where an aerobic microbe is propagating. The water to be treated from the upward flow type biotic decomposition unit 3 is introduced into an aeration tank 4. Then, the water is aerated by aeration air discharged from an air diffusion pipe 5. A part of the water to be treated inside the aeration tank 4 circulates while being conveyed back to the upward flow type biotic decomposition unit 3 by an aeration tank pump 6. Another part of the water to be treated inside the aeration tank 4 is introduced into a pump pit 7 and conveyed successively to a filter unit 9 and a primary pure water producing unit 10 by a water conveyance pump 8.

Ultrapure water producing systems utilizing a biotic treatment with an anaerobic microbe and an aerobic microbe for the pretreatment unit, are shown in FIG. 18 and FIG. 19. In these ultrapure water producing systems, aerobic organic matter treatment sections 12 and 22 are arranged in upper portions of anaerobic organic matter treatment sections 11 and 21. Charcoal pieces 13 and 23 are stowed as filler, where an anaerobic microbe and an aerobic microbe are propagating. It is to be noted that the reference numerals 14 and 24 denote plastic fillers, the reference numerals 15 and 25 denote vinylidene chloride and the reference numerals 16 and 28 denote membrane filter tanks. The reference numeral 26 denotes a hydrogen peroxide oxidation tank, while the reference numeral 27 denotes a hydrogen peroxide decomposition tank.

As described above, the ultrapure water producing system is constructed of the pretreatment unit, the primary pure water producing unit and the secondary pure water producing unit. In general, the above primary pure water producing system is constructed by combining a reverse osmosis (RO) unit, an ion exchange resin unit, an ultraviolet sterilization unit and so on. The above secondary pure water producing unit is constructed of an ultraviolet oxidation unit, an ion exchange resin unit, an ultrafiltration membrane unit and so on.

The ion exchange resin unit of the above primary pure water producing unit exchanges ions in the water to be treated by the ion exchange resin. Then, after a lapse of a specified time, the ion exchange function is restored through regeneration by hydrochloric acid and sodium hydroxide. In the regeneration stage, mineral acid (hydrochloric acid or sulfuric acid) or sodium hydroxide are needed as a chemical, and regenerated waste water results having ion concentration. In regard to this regenerated waste water, acid waste water is generated when the ion exchange resin is regenerated by the mineral acid or generated alkaline waste water is generated when the ion exchange resin is regenerated by sodium hydroxide. Either type of waste water necessitates waste water treatment of neutralization or the like as well as waste water equipment for that purpose. A tank for reserving the mineral acid or sodium hydroxide, a pump and piping for conveying the chemical are also needed.

Accordingly, from the viewpoint of reducing the space and cost, an electric deionizing system, which obviates the need for the chemicals such as ion exchange resin regenerating chemicals and the installation of regenerating equipment having no direct relation to ultrapure water production, has started to attract attention.

However, the above prior art ultrapure water producing method and ultrapure water producing system has problems as follows.

First, in the ultrapure water producing system shown in FIG. 17, the aerobic microbe is used for the pretreatment, and therefore, reductions in the amount of carbon compounds and organic nitrogen compounds can be expected. However, since no anaerobic microbe is used, the system does not have the function of reducing the nitrate nitrogen attributed to the organic nitrogen compounds into nitrogen gas. This also leads to the problem that the electrical conductivity of the water to be treated can not be reduced at all. Furthermore, since the upward flow type biotic decomposition unit 3 is the upward flow type, the activated carbon serving as a filler moves, consequently causing a problem that the microbe propagating on the activated carbon comes off. Therefore, a filter membrane unit such as an ultrafiltration membrane unit for interrupting the microbe that have flowed out is necessary, which increases the initial cost.

According to the above ultrapure water producing system disclosed in the prior art reference of Japanese Patent Laid-Open Publication No. HEI 6-63592 and the ultrapure water producing method disclosed in the prior art reference of Japanese Patent Laid-Open Publication No. HEI 6-233997, which performs a biotic treatment by means of activated carbon used as a filler, the TOC density in the water to be treated reaches about 100 ppm when the collected water is made to join the raw water, and the aerobic microbe rapidly propagates, sometimes rapidly causing partial clogging of the activated carbon due to the abnormal propagation of the aerobic microbe. Particularly with regard to the abnormal propagation of the microbe attributed to IPA and acetone, there is the problem that effect of suppressing the above clogging even when the activated carbon is washed by frequent back washing. Even under the condition that the TOC density is not specifically high, the microbe propagating on the activated carbon disadvantageously comes off due to the flow of the activated carbon since the unit stowed with activated carbon has the upward flow. In view of the above, an ultrafiltration membrane unit or a micro filter unit for interrupting the microbe that have flowed out is provided, however, there is the problem that this ultrafiltration membrane unit or the micro filter unit is disadvantageously clogged.

Furthermore, the retention time of the water to be treated in the upward flow type microbe decomposition unit used for the aforementioned pretreatment unit becomes extremely long when the TOC density of the water to be treated is increased by orders of magnitude, and this leads to a difficulty in handling in terms of system size, i.e., the problem that the water quality cannot be secured.

A ultrapure water producing system has been proposed that is provided with a pretreatment unit having a biotic treatment means and a chemical oxidation means (prior art reference of Japanese Patent Laid-Open Publication No. HEI 7-284799). In the case of this ultrapure water producing system, the TOC can be further reduced since the chemical oxidation means is used in the pretreatment unit. However, since the biotic treatment means is concurrently used, when low-concentration organic waste water having a low TOC density of about 100 ppm is introduced as water to be treated, there is the problem that the microbe that has abnormally propagated disadvantageously clog the ultrafiltration membrane unit and the micro filter unit provided in the subsequent stages.

Furthermore, the ultrapure water producing system using the biotic treatment with the anaerobic microbe and the aerobic microbe for the pretreatment unit shown in FIG. 18 and FIG. 19 employs the charcoal pieces 13 and 23 that are greater in size than the activated carbon as a filler. Accordingly, there is a small possibility of the occurrence of clogging due to the microbe and the separation of the microbe due to the upward flow when low-concentration organic waste water having a low TOC density of about 100 ppm is introduced as water to be treated, so that a more stabilized biofilm is formed. However, the arrangement of the aerobic organic matter treatment sections 12 and 22 above the anaerobic organic matter treatment sections 11 and 21 causes a problem that the height of the treatment tank becomes considerably high. The use of the charcoal pieces 13 and 23 having an adsorbing ability inferior to the activated carbon for the carbon compounds and the organic nitrogen compounds in the water to be treated also causes a problem that the pretreatment unit of the ultrapure water producing system has a low TOC removal rate.

Furthermore, by implementing the retention carrier of the microbes by the charcoal pieces 13 and 23, the flow of the retention carrier and the accompanying separation of microbes can be reduced to a certain extent. However, since the water to be treated has the upward flow and downward flow, it is impossible to prevent the separation of the microbe by completely suppressing the flow of the charcoal pieces 13 and 23.

Furthermore, as described above, the electric deionization unit has merit in producing ultrapure water for the advantage that the unit obviates the need for chemicals such as ion exchange regenerating chemicals and the installation of a regeneration unit having no direct relation to the production of ultrapure water, possibly gaining wide market acceptance in the future. However, in order to use the electric deionization unit as the primary pure water producing unit, it is required necessary to securely treat in the pretreatment unit the organic matters, dissolved gas and so on, which are other than ions and reduce the deionizing function of the electric deionization unit. In this case, the above ions mean not only dissociated ions of Na, Ca, Mg, Cl, $SO_4$ and the like but also the week ion components of $CO_2$, $SiO_2$ and the like.

In general, the electric deionization unit is installed subsequent to the reverse osmosis unit and is intended for treating the city water or the like that has a TOC density as a measure for the organic matter content of not higher than 2 ppm and a relatively high water quality. Therefore, when treating raw water having a lower water quality than that of city water, the ultrapure water producing system including the electric deionization unit also necessitates the reverse osmosis unit in the preceding stage of the electric deionization unit as well as an ultrafiltration membrane unit in the preceding stage of the reverse osmosis unit. Accordingly, this system disadvantageously has a high initial cost and running cost.

SUMMARY OF THE INVENTION

Accordingly, the object of the present invention is to provide an ultrapure water producing method and ultrapure water producing system capable of utilizing an electric deionization unit and producing ultrapure water having a TOC density of not higher than 0.5 ppb.

In order to achieve the above object, an ultrapure water producing method is provided for producing ultrapure water by pretreating raw water and thereafter introducing the resulting water successively into a primary pure water producing unit and a secondary pure water producing unit, the pretreatment comprising the steps of:

forming a circulating flow in the water to be treated by an underwater stirring means and performing an anaerobic biotic treatment in a downward flow of the circulating flow; and forming a circulating flow in the water to be treated obtained through the anaerobic biotic treatment by aerating means and performing an aerobic biotic treatment in the downward flow of the circulating flow.

According to the above construction, the water to be treated is subjected to both the anaerobic biotic treatment and the aerobic biotic treatment. Therefore, the carbon compounds and the organic nitrogen compounds in the raw water are treated by the microbes, so that the TOC density is reduced. Thus, the water to be treated is treated by the aerobic microbe and the anaerobic microbe, so that the nutrient with which the microbe propagates in the primary pure water producing unit and the secondary pure water producing unit is consumed. Consequently, the microbe abnormally propagates in neither one of the pure water producing units, so that neither one of the pure water producing units will be clogged by the abnormally propagated microbe.

In the above case, the anaerobic biotic treatment and the aerobic biotic treatment are performed in the downward flow of the water to be treated. Therefore, the flow of the retention carriers of the microbes is suppressed, thereby preventing the microbes from being separated from the retention carriers and flowing to the subsequent stage.

In order to achieve the above object, there is provided an ultrapure water producing system having a raw water pretreatment unit, a primary pure water producing unit 35 and a secondary pure water producing unit, the pretreatment unit comprising:

an anaerobic organic matter treatment chamber and an aerobic organic matter treatment chamber which are formed by separating a water tank by a partition wall and have their bottom portions communicated with each other, the raw water being introduced into the anaerobic organic matter treatment chamber, the anaerobic organic matter treatment chamber being provided with an underwater stirring means for forming a circulating flow in the water to be treated and stowed with retention carriers of an anaerobic microbe in a downward flow region of the circulating flow, and the aerobic organic matter treatment chamber 40 being provided with aerating means for forming a circulating flow in the water to be treated and stowed with retention carriers of an aerobic microbe in the downward flow region of the circulating flow.

According to the above construction, the raw water is subjected to both the anaerobic biotic treatment and the aerobic biotic treatment. Therefore, the carbon compounds and the organic nitrogen compounds in the raw water are treated by the microbes, so that the TOC density is reduced. The nitrate nitrogen generated when the organic nitrogen compounds are treated through oxidation by the aerobic microbe in the aerobic organic matter treatment chamber is denitrified by the anaerobic microbe in the anaerobic organic matter treatment chamber, so that the electrical conductivity is reduced. The water to be treated is thus treated by the aerobic microbe and the anaerobic microbe, so that the nutrient with which the microbes propagate in the primary pure water producing unit and the secondary pure water producing unit is consumed. Consequently, the microbes abnormally propagate in neither one of the pure water producing units, so that the pure water producing units are neither clogged nor contaminated by abnormally propagated microbes.

In the above case, the anaerobic treatment and the aerobic treatment are performed in the downward flow of the water to be treated. Therefore, the flow of the retention carriers of the microbes is suppressed, thereby preventing the microbes from being separated from the retention carriers and flowing to the subsequent stage.

In an embodiment of the present invention, the retention carriers are activated carbon and charcoal.

According to the above construction, the anaerobic microbe in the anaerobic organic matter treatment chamber is fixed on the activated carbon and the charcoal. Likewise, the aerobic microbe in the aerobic organic matter treatment chamber is also fixed on the activated carbon and the charcoal. In this case, the charcoal, which is greater than the activated carbon, is made to flow neither by the stirring of the underwater stirring means nor by the stirring of the aerating means, so that the fixed microbe does not come off. Furthermore, by concurrently using the activated carbon having high physical adsorption ability with regard to the carbon compounds and the organic nitrogen compounds in the water to be treated, the TOC density is further reduced by the concurrent use of the biotic treatment and the physical treatment.

In an embodiment of the present invention, the charcoal is Bincho charcoal.

According to the above construction, by using the large hard Bincho charcoal having a specific gravity of not smaller than one, the charcoal submerges, so that the charcoal is neither smashed nor made to flow by the strong stirring of the underwater stirring means and the aerating means. The microbe fixed on the Bincho charcoal is thus prevented from coming off, and the microbe that has abnormally propagated for some reason is caught and filtered by the biofilm of the large Bincho charcoal, so that neither the primary pure water producing unit nor the secondary pure water producing unit is clogged. Therefore, no filter unit is necessary between the pretreatment unit and the primary pure water producing unit.

In an embodiment of the present invention, the activated carbon is put in a bag and stacked on the charcoal, tubular nets are arranged in a vertical direction in a region in which the charcoal is stowed, and the charcoal is stowed between the tubular nets.

According to the above construction, the activated carbon that is granular and tends to flow is stowed in a bag, and therefore, the activated carbon does not flow even when the water to be treated is strongly stirred. Consequently, the fixed microbe does not come off. Furthermore, the Bincho charcoal is stowed between the tubular nets arranged in the vertical direction. Therefore, the Bincho charcoal can perform the treatment while being brought in uniform contact with the water to be treated, so that no clogging occurs even when the microbe abnormally propagates.

In an embodiment of the present invention, the activated carbon is a biotic activated carbon where a microbe is propagating, and the charcoal is a biotic activated charcoal where a microbe is propagating.

According to the above construction, the microbes are propagating on the activated carbon and the Bincho charcoal, thereby forming a biofilm. Therefore, by virtue of this biofilm layer, the organic nitrogen compounds and the carbon compounds in the water to be treated are decomposed by the microbes. Furthermore, by circulating the water to be treated through the activated carbon and the Bincho charcoal on which the biofilm is formed, the water to be treated is biologically filtered. By thus obviating the need for the regenerating work of the activated carbon and the Bincho charcoal, the TOC density is reduced by a simple method at low cost.

In an embodiment of the present invention, a low-concentration organic waste water from a semiconductor factory is introduced into the anaerobic organic matter treatment chamber.

According to the above construction, the nitrate nitrogen generated when the organic nitrogen compounds are treated through oxidation by the aerobic microbe can be treated as nitrogen gas (normal denitrification) by utilizing IPA and acetone included in the collected low-concentration organic waste water, so that the electrical conductivity is effectively reduced.

In an embodiment of the present invention, the water tank is a water receiving tank of raw water.

According to the above construction, the water receiving tank that is definitely provided for a factory using raw water is also used as a water tank for pretreatment, and therefore, the water tank of the pretreatment unit and the water receiving tank are commonly used to remarkably reduce the cost.

In an embodiment of the present invention, the pretreatment unit has an activated carbon tower which is stowed with the activated carbon and treats the water to be treated from the anaerobic organic matter treatment chamber.

According to the above construction, the remaining carbon compounds and the remaining organic nitrogen compounds and the like that have been treated neither by the microbes in the anaerobic organic matter treatment chamber nor by the aerobic organic matter treatment chamber are subjected to the advanced treatment with the activated carbon in the activated carbon tower.

In an embodiment of the present invention, the activated carbon tower is constructed of a first activated carbon tower for performing a treatment comprised principally of a biotic treatment and a second activated carbon tower for performing a treatment comprised principally of a physical treatment.

According to the above construction, the water to be treated is subjected to the biotic treatment with the microbe propagating on the activated carbon in the first activated carbon tower and the physical adsorption treatment with the activated carbon on which no microbe is propagating in the second activated carbon tower. The advanced treatment is thus effectively performed on all sorts of organic matters such as the carbon compounds and the organic nitrogen compounds in the water to be treated. Consequently, the primary pure water producing unit and the secondary pure water producing unit in the subsequent stages are allowed to have a reduced load.

In an embodiment of the present invention, the first activated carbon tower is the first activated carbon tower which treats the water to be treated from the aerobic organic matter treatment chamber and conveys the resulting water back to the anaerobic organic matter treatment chamber, and the second activated carbon tower is the second activated carbon tower which treats the water to be treated from the aerobic organic matter treatment chamber and conveys the resulting water to the primary pure water producing unit.

According to the above construction, in the final stage of the pretreatment unit in which the water to be treated from the aerobic organic matter treatment chamber is conveyed to the primary pure water producing unit, the physical adsorption treatment is performed with the activated carbon on which the microbe is propagating less. Thus, the treated water, in which all sorts of organic matters such as the carbon compounds and the organic nitrogen compounds have been surely treated by only the physical adsorption effect inherent to the activated carbon, is conveyed to the primary pure water producing unit.

In an embodiment of the present invention, the primary pure water producing unit includes an electric deionization unit.

According to the above construction, the stable treated water obtained by subjecting raw water to the biotic treatment and the physical adsorption treatment for the achievement of a water quality of a low TOC density and a low electrical conductivity (good water quality) is introduced into the primary pure water producing unit including the electric deionization unit. Therefore, the electric deionization unit functions without generating waste water to be regenerated as in the ion exchange resin unit nor causing functional degradation due to the existence of organic matters, dissolved gas or the like, so that ultrapure water having a TOC density of not higher than 0.5 ppb can be obtained.

In an embodiment of the present invention the ultrapure water producing system further comprising:

a first back washing drain pipe whose one end is connected to an upper portion of the anaerobic organic matter treatment chamber;

a second back washing drain pipe whose one end is connected to an upper portion of the aerobic organic matter treatment chamber;

a back washing blower; and an air diffusion pipe which is installed just below the retention carrier of the anaerobic microbe and the retention carrier of the aerobic microbe and diffuses air from the back washing blower.

According to the above construction, the anaerobic microbe that has taken into its body the ions in the water to be treated and propagated on the surface of the retention carrier in the anaerobic organic matter treatment chamber is back-washed by air that comes from the back washing blower and is diffused from the diffusing pipe just below the retention carrier is separated from the retention carrier. Then the separated microbe is drained through the first and second back washing pipes whose one end is connected to the upper portions of both the organic matter treatment chambers. Thus, the anaerobic microbe propagating on the surface of the retention carrier is forcedly removed by the back washing before being naturally separated by the water flow and so on, as a consequence of which the primary pure water producing unit is not functionally degraded by the microbe separated naturally.

In an embodiment of the present invention, concentrated water including concentrated ions from the electric deionization unit is introduced into the anaerobic organic matter treatment chamber.

According to the above construction, the concentrated water from the electric deionization unit is reused. In this case, the ions in the concentrated water are taken into the body of the microbe in the anaerobic organic matter treatment chamber and treated.

In an embodiment of the present invention the ultrapure water producing system further comprising:

an auxiliary electric deionization unit into which the concentrated water from the electric deionization unit is introduced, for performing a deionizing treatment on the concentrated water, the water to be treated from the auxiliary electric deionization unit being introduced into the anaerobic organic matter treatment chamber.

According to the above construction, the concentrated water from the electric deionization unit is deionized by the auxiliary electric deionization unit and thereafter introduced into the anaerobic organic matter treatment chamber for reuse. Consequently, the ionic load inside the anaerobic organic matter treatment chamber is reduced.

In an embodiment of the present invention the ultrapure water producing system further comprising:

an auxiliary electric deionization unit into which the concentrated water from the electric deionization unit is introduced, for performing a deionizing treatment on the concentrated water; and a treatment water tank which receives the water to be treated from the auxiliary electric deionization unit together with the water to be treated from the second activated carbon tower.

According to the above construction, the concentrated water from the electric deionization unit is deionized by the auxiliary electric deionization unit. Therefore, particularly when no organic matter is included, there is no need for introducing the water into the anaerobic organic matter treatment chamber, and the water is reused together with the treated water from the second activated carbon tower while being introduced into the treated water tank in the stage subsequent to the anaerobic organic matter treatment chamber and the aerobic organic matter treatment chamber. Consequently, the anaerobic organic matter treatment chamber and the aerobic organic matter treatment chamber can function with a volume reduced by the volume of the treated water from the auxiliary electric deionization unit.

In an embodiment of the present invention the ultrapure water producing system further comprising:

circulating means for circulating the water to be treated through the anaerobic organic matter treatment chamber, the aerobic organic matter treatment chamber and the first activated carbon tower.

According to the above construction, the repetitive circulation of the water to be treated through the anaerobic organic matter treatment chamber, the aerobic organic matter treatment chamber and the first activated carbon tower has an effect when the carbon compounds and the organic nitrogen compounds are not sufficiently treated while being made to pass one time through the anaerobic organic matter treatment chamber, the aerobic organic matter treatment chamber and the first activated carbon tower. Furthermore, by circulating the water to be treated through the first activated carbon tower at a rapid flow rate, the dissolved oxygen in the first activated carbon tower can be maintained to a certain extent (not smaller than 1 ppm), so that the activated carbon in the first activated carbon tower becomes a biotic activated carbon. Furthermore, the nitrate nitrogen generated through the oxidation treatment of the organic nitrogen compounds by the aerobic microbe in the aerobic organic matter treatment chamber is denitrified by being conveyed back to the anaerobic organic matter treatment chamber, so that the electrical conductivity is reduced.

In an embodiment of the present invenetion, the ultrapure water producing system further comprising:

a TOC meter which measures a TOC density of the water to be treated from the second activated carbon tower and outputs a signal representing the measured TOC density; and a TOC control means which controls at least one or a combination of a rotating speed of the underwater stirring means, a rate of aeration of the aerating means and a rate of circulation of the circulating means based on the signal from the TOC meter.

According to the above construction, even if the carbon compounds and the organic nitrogen compounds are rapidly increased to degrade the water quality, then at least one or a combination of an increase in the rotating speed of the underwater stirring means, an increase in the rate of aeration of the aerating means and an increase in the rate of circulation of the circulating means is performed on the basis of the signal from the TOC meter, so that the ability for treating the carbon compounds and the organic nitrogen compounds is improved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
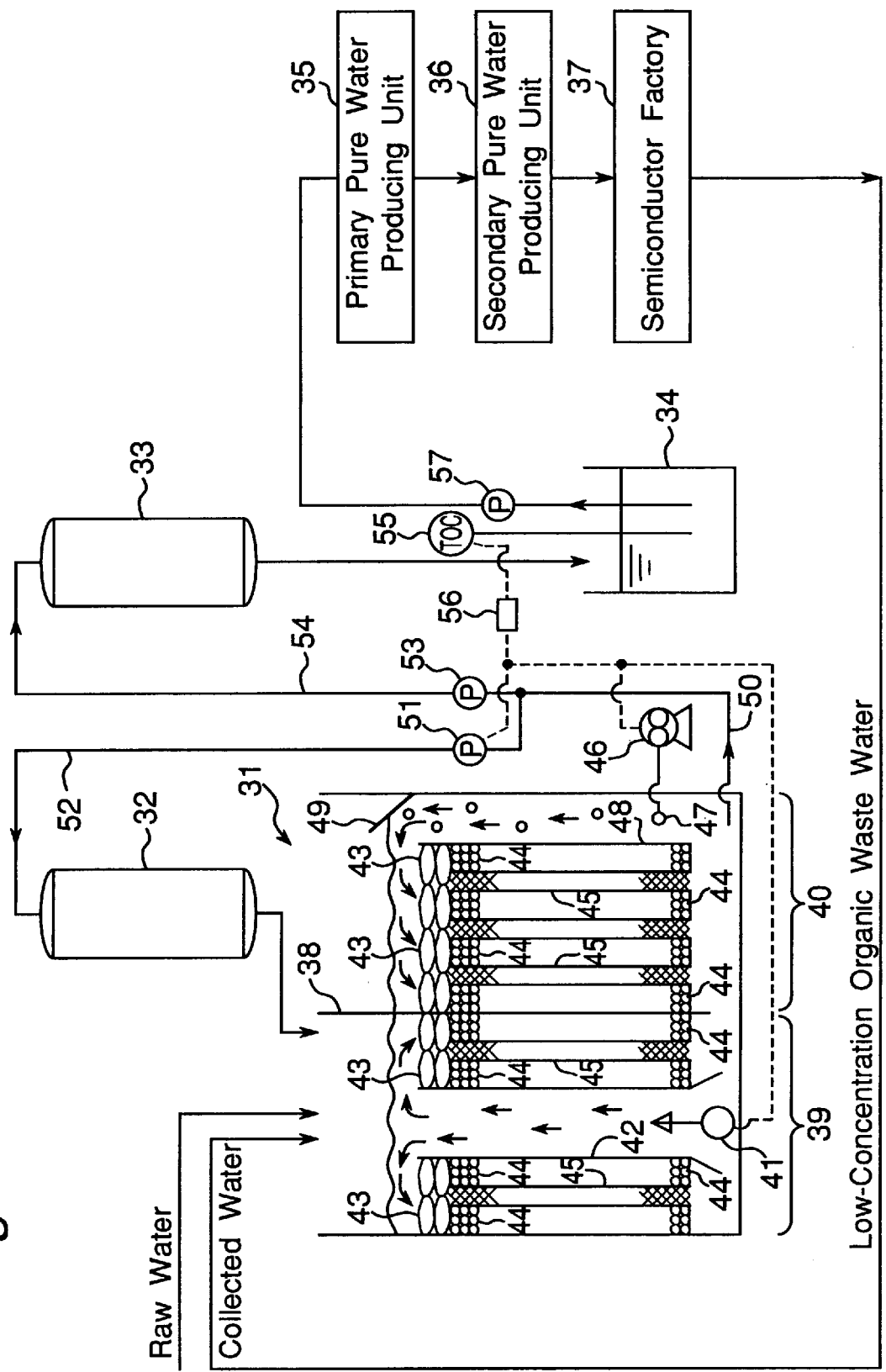
FIG. 1 is a schematic view showing an example of an ultrapure water producing system of the present invention.

The present invention will be described in detail below on the basis of the embodiments thereof shown in the drawings.
<First Embodiment>

FIG. 1 is a schematic view of an ultrapure water producing system of the present embodiment. This ultrapure water producing system introduces raw water of either one or a combination of industrial water, city water and underground water. The industrial water, city water and underground water contain all sorts of organic matters including organic nitrogen compounds. Collected water to be introduced together with the raw water is defined as low-concentration organic waste water having a TOC density of not higher than 100 ppm from a semiconductor factory.

The aforementioned pretreatment unit is roughly constructed of a first water tank 31 into which the raw water and the collected water are introduced, a circulation use activated carbon tower 32 for circulating water to be treated in the first water tank 31 through activated carbon, a water conveyance use activated carbon tower 33 for conveying the water to be treated in the first water tank 31 through activated carbon to a second water tank 34 and the second water tank 34. Further, the ultrapure water producing system is constructed of this pretreatment unit, a primary pure water producing unit 35 and a secondary pure water producing unit 36. Then ultrapure water from the secondary pure water producing unit 36 is used in a semiconductor factory 37, and drain water is introduced as the collected water into the first water tank 31.

The first water tank 31 is partitioned by a partition wall 38 into an anaerobic organic matter treatment chamber 39 and an aerobic organic matter treatment chamber 40 except for a bottom portion, and the anaerobic organic matter treatment chamber 39 and the aerobic organic matter treatment chamber 40 are communicated with each other at the bottom portion. Then, the raw water and the collected water are introduced from above the anaerobic organic matter treatment chamber 39.

An underwater stirrer 41 is provided in a center bottom portion of the anaerobic organic matter treatment chamber 39, and a cylindrical water flow draft 42 is provided around this underwater stirrer 41. Thus, the whole anaerobic organic matter treatment chamber 39 is efficiently stirred without supplying oxygen. Activated carbon bags 43 stowed with activated carbon are arranged in two layers in an upper position between the water flow draft 42 and the peripheral wall of the anaerobic organic matter treatment chamber 39, and a large amount of Bincho charcoal 44 is stowed below the bags. It is to be noted that the Bincho charcoal 44 is stowed between tubular nets arranged at regular intervals in a vertical direction so that water can smoothly flow downward inside the anaerobic organic matter treatment chamber 39. In this case, the tubular net 45 is formed by connecting both sides of a rectangular net.

The reason why the activated carbon is stowed in the bags to provide the activated carbon bags 43 is that the activated carbon itself is smaller than the Bincho charcoal 44, and it disadvantageously falls downwardly of the anaerobic organic matter treatment chamber 39 unless put in a bag. The above bag is not specifically limited so long as the bag has durability, and nylon is employed in the present embodiment. Although the activated carbon bags 43 are stacked in two layers in the present embodiment, the present invention is not limited to this arrangement. If the bags are stacked in an excessive number of layers, then there is the possibility that clogging may occur when the water to be treated having a high TOC density flows in and the microbe abnormally propagates, and therefore, several layers are preferable. If the capacity of the activated carbon bag 43 is set to about 20 litters, the bag can easily be manually installed.

As described above, the anaerobic organic matter treatment chamber 39 is maintained in an anaerobic state by preventing the entry of oxygen by mechanical stirring by the underwater stirrer 41. In contrast to this, the aerobic organic matter treatment chamber 40 is maintained in an aerobic state by air lift for discharging air from a blower 46 into the water to be treated by an air diffusion pipe 47 placed at a bottom portion and stirring the water to be treated by an upward flow of the air.

The aerobic organic matter treatment chamber 40 is separated by a separation wall 48 into an air lift section and a filler, and the air diffusion pipe 47 is placed in a lower portion of the air lift section for the formation of an efficient circulating flow. Then, a water flow wall 49 is placed in an upper portion of the air lift section, thereby changing the direction of the lifted water flow for the achievement of efficient circulation.

Activated carbon bags 43 stowed with activated carbon are arranged in two layers between the air lift section and the partition wall 38 in the aerobic organic matter treatment chamber 40 and a large amount of Bincho charcoal 44 is stowed between the tubular nets below the bags similar to the case of the anaerobic organic matter treatment chamber 39.

In this case, the tubular nets 45 are not always required to be provided, however, there is the following advantages when the tubular nets are provided.

(1) The clogging in the case where the TOC density of the raw water is rapidly increased and the microbe is abnormally propagating can be prevented.

(2) Water easily flows through the tubular net 45, and therefore, a totally uniform circulating water flow is generated involving the surrounding fillers around the tubular net 45. Therefore, the water to be treated is treated in uniform contact with the fillers. In contrast to this, in the absence of the tubular net 45, the Bincho charcoal 44, which is a natural product and has irregular shapes, comes to have a partially increased stowing density, sometimes causing a place where the circulation water flow is difficult to occur.

The water flow in the region in which the activated carbon bags 43 and the Bincho charcoal 44 are stowed in the anaerobic organic matter treatment chamber 39 and the aerobic organic matter treatment chamber 40 is directed from the upside to the downside. Therefore, the activated carbon in the activated carbon bags 43 and the Bincho charcoal 44 having a specific gravity of slightly greater than one are settled while being pressed downward by the water flow and do not flow. Therefore, the microbe is not separated from the activated carbon by the flow of activated carbon as in the case of the upward flow.

The activated carbon in the activated carbon bags 43 and the Bincho charcoal 44 are porous bodies having many micropores, and the diameter of each micropore ranges from several microns to several hundred microns. Therefore, a variety of microbes corresponding to the pores of the activated carbon and the Bincho charcoal 44 easily propagate, consequently forming a biofilm layer inside the activated carbon and the Bincho charcoal 44. Then, this biofilm layer of the microbes decomposes the carbon compounds, the organic nitrogen compounds and so on in the water to be treated. Furthermore, by circulating the water to be treated with respect to the activated carbon and the Bincho charcoal 44 on which the biofilm layer is formed, the water to be treated is biologically filtered. That is, the TOC and the suspended solids (SS) are reduced.

The Bincho charcoal 44 inside the anaerobic organic matter treatment chamber 39 and the aerobic organic matter treatment chamber 40 is not smashed by the strong water flow or strong aeration air. This Bincho charcoal 44 is a Japanese traditional charcoal and is a hard charcoal of the broad-leaved tree of holm oak. The hard charcoal means the charcoal carbonized at a temperature of about 1000° C. and is positioned as a high-temperature carbonized charcoal. As the Bincho charcoal 44 to be stowed in the present embodiment, a Bincho charcoal having a diameter of 4 cm to 6 cm and a length of not shorter than 5 cm is selected so as to bring the charcoal in sufficient contact with the water to be treated and not to cause clogging when a microbe abnormally propagates for some reason. The biofilm layer is formed on the surface of the Bincho charcoal 44 as stated before. Therefore, the microbe floating during normal operation can be caught and filtered by the biofilm layer. Furthermore, even when microbes abnormally propagates as a consequence of the introduction of raw water having a high TOC density of about 100 ppm, the greater part of the microbes can be caught and filtered by the biofilm layer. Therefore, the possible occurrence of clogging of the circulation use activated carbon tower 32 and the water conveyance use activated carbon tower 33 in the subsequent stages can be prevented.

Part of the water to be treated from the aerobic organic matter treatment chamber 40 is conveyed from a common suction header pipe 50 to the circulation use activated carbon tower 32 via a circulation pipe 52 by an activated carbon tower circulation pump 51. Simultaneously with the above operation, the remaining water to be treated from the suction header pipe 50 is conveyed to the water conveyance use activated carbon tower 33 via a water conveyance pipe 54 by an activated carbon tower water conveyance pump 53. Then, the water to be treated conveyed to the circulation use activated carbon tower 32 is introduced again into the anaerobic organic matter treatment chamber 39 of the first water tank 31. Thus, the water to be treated is treated while being circulated between the first water tank 31 and the circulation use activated carbon tower 32.

The water to be treated conveyed to the water conveyance use activated carbon tower 33 is introduced into the second water tank 34. This second water tank 34 is a tank for easily supplying the water to be treated from the water conveyance use activated carbon tower 33 to the primary pure water producing unit 35 by a pump 57. In this case, it can be considered to directly convey the water to be treated from the water conveyance use activated carbon tower 33 to the primary pure water producing unit 35. However, the above scheme is practically impossible due to the insufficient lift of the activated carbon tower water conveyance pump 53. Therefore, the water to be treated is once received by the second water tank 34 and then conveyed to the primary pure water producing unit 35 by the pump 57 for conveying the water of the primary pure water producing unit.

The second water tank 34 is provided with the TOC meter 55 for measuring the TOC density of the water to be treated and outputting an electric signal representing the TOC density, and the signal from the TOC meter 55 is transmitted to a controller 56. Then, the controller 56 outputs a control signal corresponding to the TOC density of the water to be treated in the second water tank 34 to the activated carbon tower circulation pump 51, the blower 46 and the underwater stirrer 41 so as to inverter-control the rate of discharge of the activated carbon tower circulation pump 51, the rate of blow of the blower 46 and the rotating speed of the underwater stirrer 41.

The water conveyance to the circulation use activated carbon tower 32 is at a rate of not samller than 2 m$^3$/hour per 1 m$^3$ of the activated carbon inside the circulation use activated carbon tower 32. Since the flow rate is great, remaining oxygen of not smaller than 1 ppm is secured inside the circulation use activated carbon tower 32, providing a biotic activated carbon on which the aerobic microbe is propagating. On the other hand, the water conveyance to the water conveyance use activated carbon tower 33 is at a rate of not greater than 1 m$^3$/hour per 1 m$^3$ of the activated carbon inside the water conveyance use activated carbon tower 33. Since the flow rate is small, although the aerobic microbe propagates in the upper portion of the water conveyance use activated carbon tower 33, the microbe propagates less on the activated carbon throughout the entire water conveyance use activated carbon tower 33. Therefore, the physical adsorption function inherent to the activated carbon shares the greater part than the biotic treatment function, so that the treatment is mostly achieved by the physical adsorption function in the water conveyance use activated carbon tower 33. Then, by using this water conveyance use activated carbon tower 33 for finishing the treatment of carbon compounds, the water to be treated is slowly surely treated by the physical adsorption function, so that the rate of removal of the carbon compounds is increased.

The water to be treated from the second water tank 34 is conveyed by the pump 57 to the primary pure water producing unit 35 obtained by combining a reverse osmosis unit, an ion exchange resin unit, an ultraviolet sterilization unit and so on. The water to be treated from the primary pure water producing unit 35 is conveyed to the secondary pure water producing unit 36 constructed of an ultraviolet oxidation unit, an ion exchange resin unit, an ultrafiltration membrane unit and so on, and the final ultrapure water is obtained by this secondary pure water producing unit 36. This ultrapure water is conveyed to the semiconductor factory 37 and used in a variety of production apparatuses. Then, the low-concentration organic waste water having the TOC dencity of not greater than 100 ppm including IPA and acetone obtained as waste water from the production apparatuses is mixed with raw water and introduced into the anaerobic organic matter treatment chamber 39 of the first water tank 31. Then, the denitrification treatment for reducing the nitrate nitrogen produced by oxidizing the organic nitrogen compounds in the raw water by the aerobic microbe into nitrogen gas is effectively performed taking advantage of the characteristics of the hydrogen donors such as IPA and acetone in the collected water.

The ultrapure water producing system having the above construction operates as follows.

Raw water is introduced together with the collected water (low-concentration organic waste water) from the semiconductor factory 37 into the anaerobic organic matter treatment chamber 39 of the first water tank 31. Then, by the operation of the activated carbon tower circulation pump 51, the water to be treated circulates sequentially from the anaerobic organic matter treatment chamber 39→aerobic organic matter treatment chamber 40→circulation use activated carbon tower 32→anaerobic organic matter treatment chamber 39→ . . . . Then, while being circulated, this water to be treated undergoes the following treatments so as to reduce the TOC and electrical conductivity of the water to be treated.

(1) In the anaerobic organic matter treatment chamber 39 and the aerobic organic matter treatment chamber 40, the carbon compounds in the water to be treated are subjected to biotic treatment by the anaerobic microbe and the aerobic microbe. The carbon compounds are also physically treated to be adsorbed by the activated carbon in the activated carbon bags 43 and the Bincho charcoal 44.

(2) Particularly in the aerobic organic matter treatment chamber 40, organic nitrogen compounds are subjected to an oxidation treatment by the aerobic microbe to become nitrate nitrogen.

(3) In the circulation use activated carbon tower 32, remaining carbon compounds, remaining organic nitrogen compounds and so on are subjected to biotic treatment (advanced treatment) by the biotic activated carbon.

(4) In the anaerobic organic matter treatment chamber 39, the nitrate nitrogen generated through the treatment (2) is denitrified to become nitrogen gas in the presence of the IPA and acetone in the collected water, thereby reducing the electrical conductivity.

Then, by the activated carbon tower water conveyance pump 53, the water to be treated from the aerobic organic matter treatment chamber 40 is conveyed to the water conveyance use activated carbon tower 33 and the organic nitrogen compounds that have not been able to be decomposed by the microbes are subjected to the advanced treatment of the physical adsorption treatment by abiotic activated carbon.

The TOC and electrical conductivity are thus reduced, and the water to be treated, which has undergone the advanced treatment, is conveyed by the pump 57 successively to the primary pure water producing unit 35 and the secondary pure water producing unit 36. Then, the final ultrapure water is obtained from the secondary pure water producing unit 36.

As described above, in the present embodiment, the pretreatment unit constituting the ultrapure water producing system is provided with the first water tank 31 that is partitioned except for the bottom portion by the partition wall 38 into the anaerobic organic matter treatment chamber 39 and the aerobic organic matter treatment chamber 40 into which the raw water and the collected water are introduced. Then, the activated carbon bags 43 stowed with the activated carbon are arranged in two layers in the upper portion of the anaerobic organic matter treatment chamber 39 and the aerobic organic matter treatment chamber 40, and a large amount of Bincho charcoal 44 is stowed below the bags. Aerationless stirring is performed in the anaerobic organic matter treatment chamber 39, while aeration stirring is performed in the aerobic organic matter treatment chamber 40. Therefore, the anaerobic microbe is propagating on the activated carbon in the activated carbon bags 43 and on the Bincho charcoal 44 in the anaerobic organic matter treatment chamber 39, while the aerobic microbe is propagating on the activated carbon in the activated carbon bags 43 and on the Bincho charcoal 44 in the aerobic organic matter treatment chamber 40. As a result, the nutrients (organic matters of IPA, acetone, organic nitrogen compounds and so on) of both the anaerobic microbe and the aerobic microbe in the water to be treated are consumed (treated), so that a treated water for subsequent processes in which both the microbes are difficult to propagate can be obtained.

Figure 18:
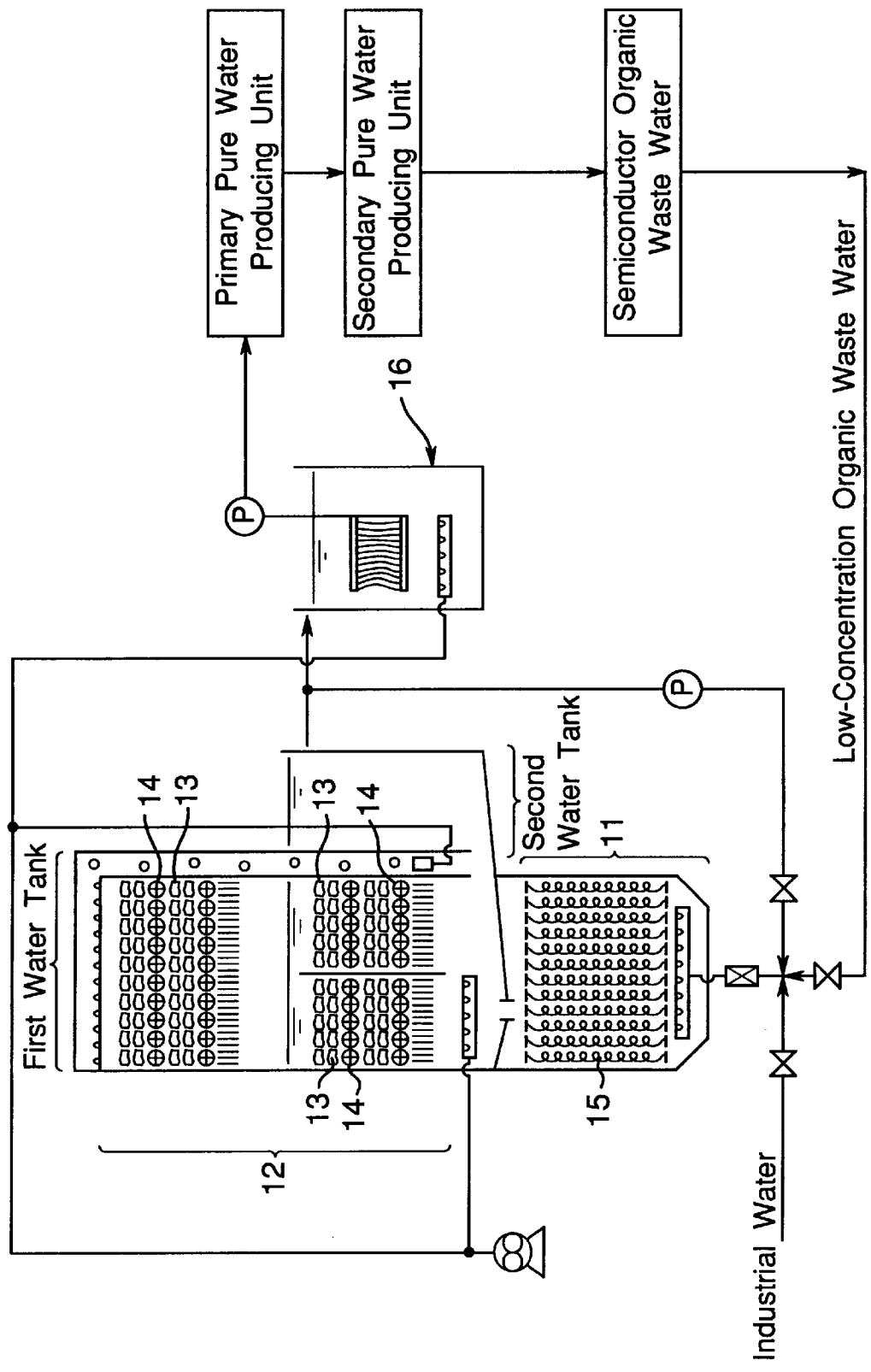
FIG. 18 is a schematic view of a prior art ultrapure water producing system utilizing a biotic treatment with an anaerobic microbe and an aerobic microbe in its pretreatment unit.

Furthermore, the organic nitrogen compounds in the raw water are subjected to the oxidation treatment by the aerobic microbe in the aerobic organic matter treatment chamber 40, thereby reducing TOC. The nitrate nitrogen generated by oxidizing the organic nitrogen compounds by the aerobic microbe is denitrified to become nitrogen gas by the anaerobic microbe in the anaerobic organic matter treatment chamber 39, thereby reducing the electrical conductivity of the water to be treated. In this case, the anaerobic organic matter treatment chamber 39 and the aerobic organic matter treatment chamber 40 are juxtaposed, and therefore, the height of the first water tank 31 can be reduced further than when vertically arranged as in the pretreatment unit shown in FIG. 18 and FIG. 19.

The water to be treated from the aerobic organic matter treatment chamber 40 in the first water tank 31 is conveyed to the circulation use activated carbon tower 32 by the activated carbon tower circulation pump 51 and conveyed back to the anaerobic organic matter treatment chamber 39 through this circulation use activated carbon tower 32. With this arrangement, the carbon compounds and the organic nitrogen compounds that have not been able to be decomposed by the microbe in the water to be treated can be subjected to the advanced treatment by the biotic activated carbon in the circulation use activated carbon tower 32, so that TOC can be further reduced.

The water to be treated from the aerobic organic matter treatment chamber 40 is conveyed to the water conveyance use activated carbon tower 33 by the activated carbon tower water conveyance pump 53 and conveyed to the second water tank 34 through this water conveyance use activated carbon tower 33. With this arrangement, not only the advanced treatment of the carbon compounds and the organic nitrogen compounds that have not been able to be decomposed by the microbe in the water to be treated but also the treatment of the various components that have not been able to be biologically decomposed can be surely performed by the physical adsorption treatment with the activated carbon in the water conveyance use activated carbon tower 33, so that the organic matter load of the subsequent process can be reduced as far as possible. As a result, the TOC of the water to be treated obtained by treating the water to be treated from the second water tank 34 by the primary pure water producing unit 35 and the secondary pure water producing unit 36 is allowed to have a density of not higher than 0.5 ppb.

In the anaerobic organic matter treatment chamber 39 and the aerobic organic matter treatment chamber 40 of the first water tank 31, the activated carbon bags 43 stowed with activated carbon are arranged in two layers in the upper portions, and a large amount of Bincho charcoal 44 (having a diameter of 4 cm to 6 cm and a length of not shorter than 5 cm) is stowed below the bags. The underwater stirrer 41 is provided inside the anaerobic organic matter treatment chamber 39, while the air diffusion pipe 47 connected to the blower 46 is provided in the aerobic organic matter treatment chamber 40. With this arrangement, if microbes abnormally propagate inside the first water tank 31 for some reason, the greater part of the microbes is caught and filtered by the biofilm layers formed on the activated carbon and the Bincho charcoal 44, so that the circulation use activated carbon tower 32 and the water conveyance use activated carbon tower 33 can be prevented from being clogged. Furthermore, by concurrently using the activated carbon bags 43 and the Bincho charcoal 44, the TOC can be reduced further than when only the charcoal is used as in the pretreatment unit shown in FIG. 18 and FIG. 19. Furthermore, the Bincho charcoal 44 is stowed between the tubular nets 45 arranged at regular intervals in the vertical direction so that water can flow smoothly. Therefore, the possible occurrence of clogging when the microbes abnormally propagate for some reason can be prevented.

The activated carbon bags 43 and the Bincho charcoal 44 are stowed in the region of the downward flow in the anaerobic organic matter treatment chamber 39 and the aerobic organic matter treatment chamber 40. Therefore, the activated carbon and the Bincho charcoal 44 inside the activated carbon bags 43 are pressed downward by the water flow and do not flow. Therefore, the microbes are not separated from the activated carbon by the flow of the activated carbon and the Bincho charcoal 44.

In the above embodiment, the TOC meter 55 for measuring the TOC density of the water to be treated is provided for the second water tank 34 into which the water to be treated from the water conveyance use activated carbon tower 33 is introduced. Then, the rate of discharge of the activated carbon tower circulation pump 51, the rate of blow of the blower 46 and the rotating speed of the underwater stirrer 41 are inverter-controlled on the basis of the signal representing the TOC density from the TOC meter 55. Therefore, assuming that the water quality of the influent water is degraded to have an increased amount of TOC, the rate of circulation of the water to be treated in the first water tank 31 and the circulation use activated carbon tower 32 are increased and the rate of stirring is increased, thereby further reducing the TOC. That is, according to the above embodiment, the water quality of the water to be treated can be ensured, and the reliability of the whole ultrapure water producing system can be improved.

In the above embodiment, the low-concentration organic waste water from the semiconductor factory 37 is made to join the raw water as collected water and introduced into the anaerobic organic matter treatment chamber 39. Therefore, when the nitrate nitrogen generated by oxidizing the organic nitrogen compounds in the raw water by the aerobic microbe is denitrified by the anaerobic microbe in the anaerobic organic matter treatment chamber 39, the IPA and acetone in the above low-concentration organic waste water can be effectively utilized, and this facilitates rapid treatment even with an abundance of organic nitrogen compounds in the water to be treated, thereby allowing the electrical conductivity to be reduced.

That is, the present embodiment can cope with a change in water quality (for example, a sudden increase in TOC density) occurring for some reason, thereby allowing ultrapure water having a TOC density of not higher than 0.5 ppb and a low electrical conductivity to be produced.

In the above embodiment, by utilizing the water receiving tank that is surely provided for the factory using raw water as the first water tank 31, a cost reduction can be achieved.

Figure 2:
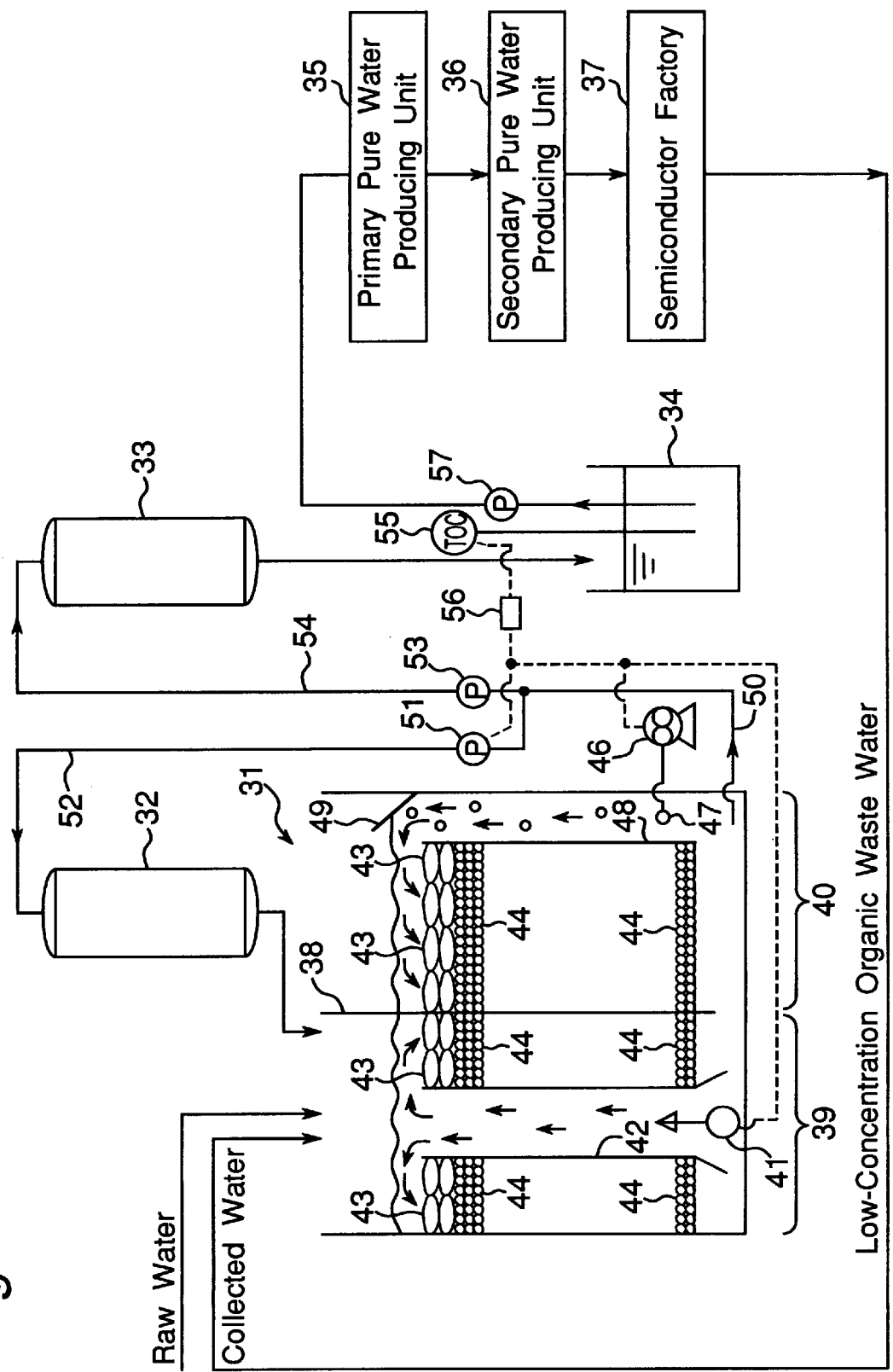
FIG. 2 is a schematic view showing an ultrapure water producing system different from that of FIG. 1.

As described above, the tubular nets 45, 45, . . . that are arranged at regular intervals in the vertical direction so that water can smoothly flow inside the Bincho charcoal 44 are not always required to be provided. FIG. 2 is a schematic view of an ultrapure water producing system obtained by removing the tubular nets 45, 45, . . . from the ultrapure water producing system shown in FIG. 1. When there is no tubular net 45 inside the first water tank 31 as described above, the Bincho charcoal 44 can be stowed more by the volume of the tubular net 45, and therefore, the treatment efficiency of the water to be treated is increased. Particularly when the water quality of the raw water or the water quality of the low-concentration organic waste water is good, the clogging due to the propagation of the microbes is hard to occur, meaning that the tubular net 45 should preferably be removed.

Although the first water tank 31 is stowed with the Bincho charcoal 44 in the above embodiment, substantially the same effect as that of the Bincho charcoal 44 can be obtained even when the normal charcoal is stowed, by selecting the size and hardness of the charcoal.

In the above embodiment, the rate of discharge of the activated carbon tower circulation pump 51, the rate of blow of the blower 46 and the rotating speed of the underwater stirrer 41 are inverter-controlled on the basis of the signal representing the TOC density from the TOC meter 55. However, the present invention is not limited to this, and it is proper to control at least one or a combination of the rate of discharge of the activated carbon tower circulation pump 51, the rate of blow of the blower 46 and the rotating speed of the underwater stirrer 41.

<Second Embodiment>

Figure 3:
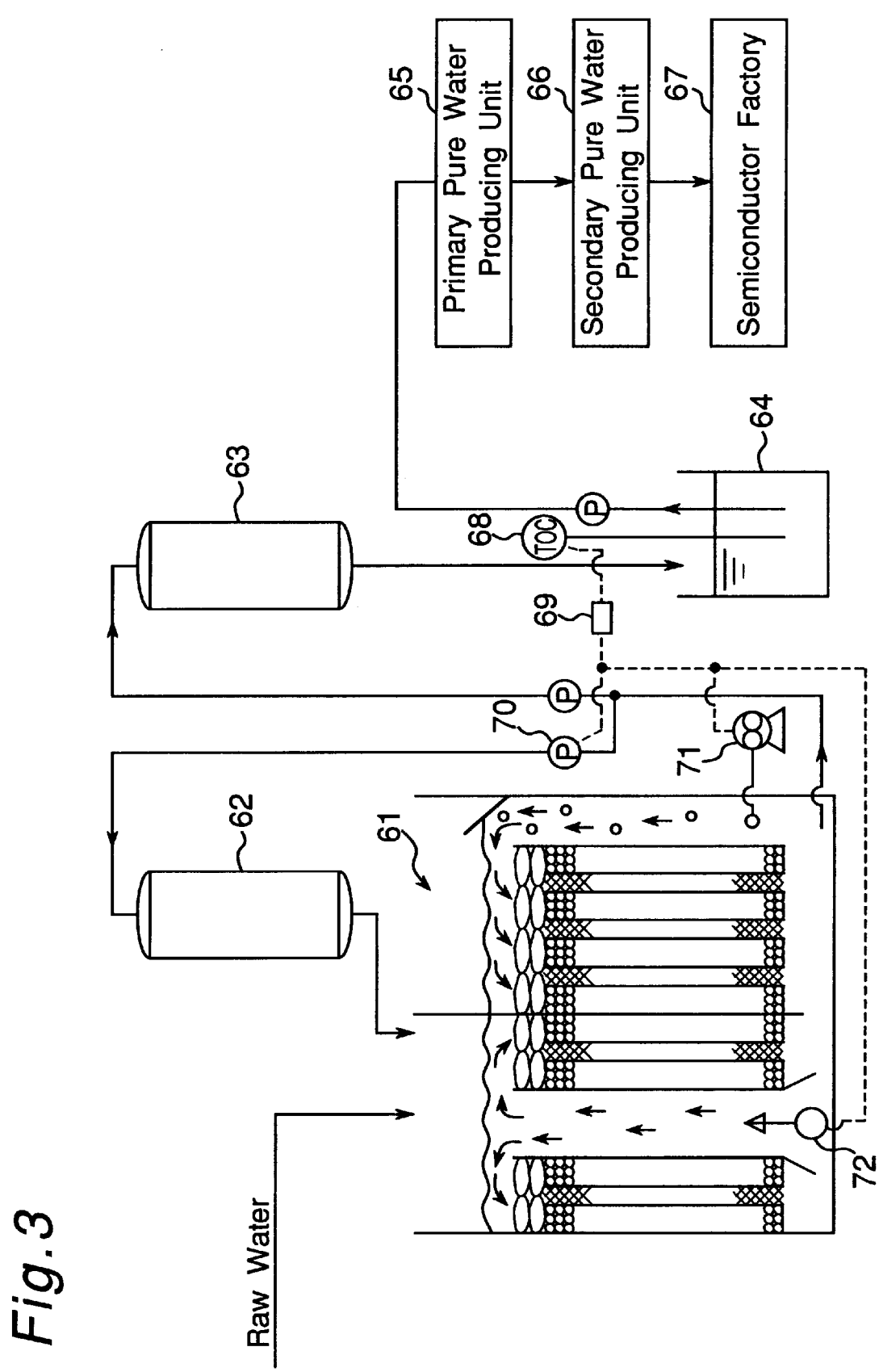
FIG. 3 is a schematic view showing an ultrapure water producing system different from those of FIG. 1 and FIG. 2.

FIG. 3 is a schematic view of an ultrapure water producing system according to the present embodiment. This ultrapure water producing system has a construction such that the collected water from the semiconductor factory 37 is not introduced into the ultrapure water producing system of the first embodiment shown in FIG. 1.

A first water tank 61, a circulation use activated carbon tower 62, a water conveyance use activated carbon tower 63, a second water tank 64, a primary pure water producing unit 65, a secondary pure water producing unit 66 and a semiconductor factory 67 have constructions and operations similar to those of the first water tank 31, circulation use activated carbon tower 32, water conveyance use activated carbon tower 33, second water tank 34, primary pure water producing unit 35, secondary pure water producing unit 36 and semiconductor factory 37 shown in FIG. 1. Similar to the case of the first embodiment, the rate of discharge of an activated carbon tower circulation pump 70, the rate of blow of a blower 71 and the rotating speed of an underwater stirrer 72 are inverter-controlled on the basis of a control signal from a controller 69 based on a signal from a TOC meter 68 provided for the second water tank 64.

In the present embodiment, as described above, the collected water from the semiconductor factory 67 is not introduced into the anaerobic organic matter treatment chamber of the first water tank 61. Therefore, the IPA and acetone in the low-concentration organic waste water from the semiconductor factory 67 cannot be utilized when denitrifying by the anaerobic microbe the nitrate nitrogen produced during the organic nitrogen compound treatment with the aerobic microbe. That is, the denitrifying performance with an abundance of organic nitrogen compounds in the water to be treated is worse than that of the first embodiment. However, by prolonging the retention time of the water to be treated in the first water tank 61 or taking another measure, the system can cope, to some extent, with the case of a small amount of organic nitrogen compounds in the water to be treated or a similar case. Therefore, this system can be applied to the case of a small amount of organic nitrogen compounds in raw water, so that an ultrapure water producing system capable of producing ultrapure water having a reduced amount of TOC and a low electrical conductivity can be provided at low cost.

<Third Embodiment>

Figure 4:
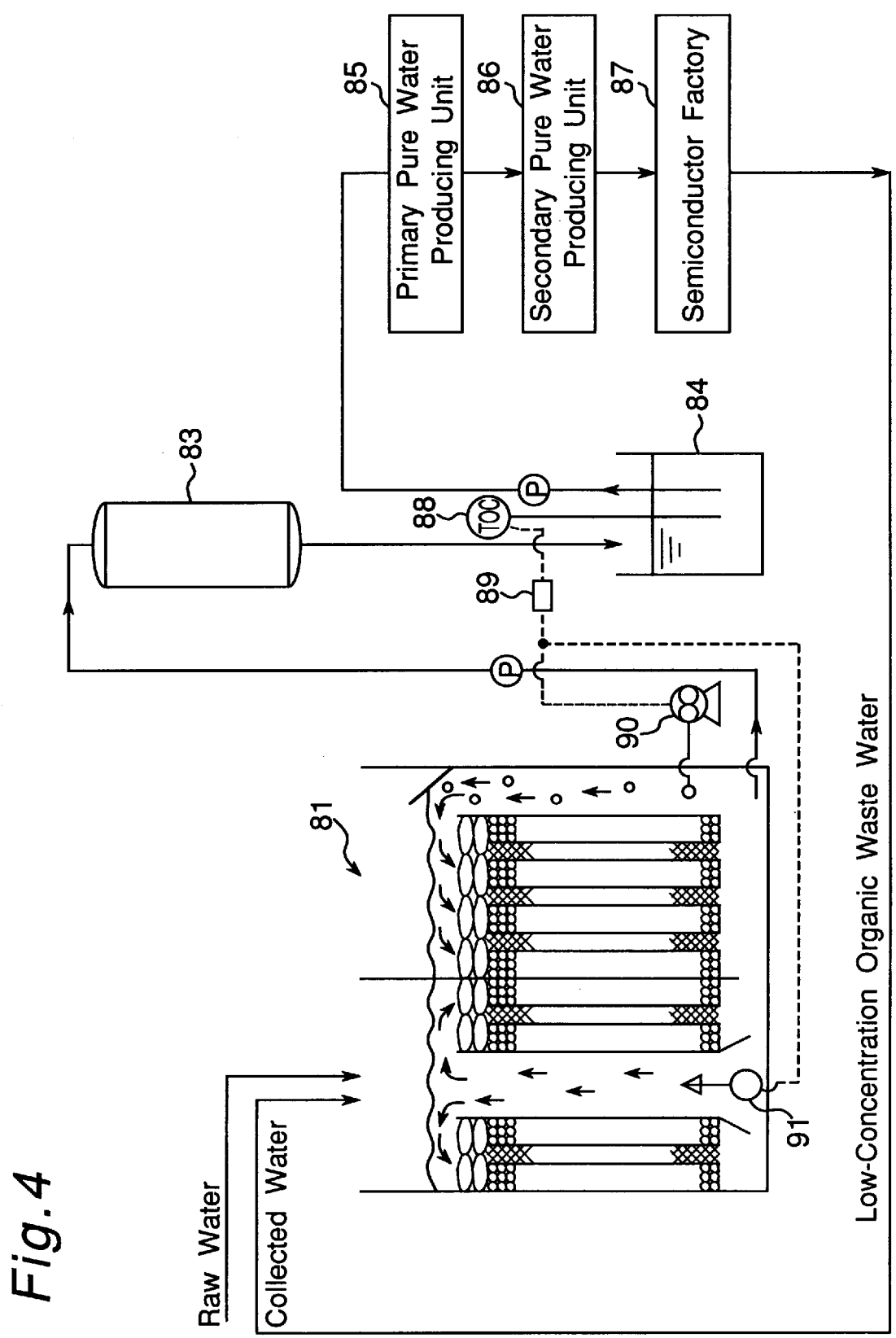
FIG. 4 is a schematic view showing an ultrapure water producing system different from those of FIG. 1 through FIG. 3.

FIG. 4 is a schematic view of an ultrapure water producing system according to the present embodiment. This ultrapure water producing system has a construction such that the circulation use activated carbon tower 32 is removed from the ultrapure water producing system of the first embodiment shown in FIG. 1.

A first water tank 81, a water conveyance use activated carbon tower 83, a second water tank 84, a primary pure water producing unit 85, a secondary pure water producing unit 86 and a semiconductor factory 87 have constructions and operations similar to those of the first water tank 31, water conveyance use activated carbon tower 33, second water tank 34, primary pure water producing unit 35, secondary pure water producing unit 36 and semiconductor factory 37 shown in FIG. 1. Similar to the case of the first embodiment, the low-concentration organic waste water from the semiconductor factory 87 is mixed as collected water with raw water and introduced into the anaerobic organic matter treatment chamber of the first water tank 81.

As described above, the present embodiment is provided with neither the circulation use activated carbon tower nor the circulating means for conveying part of the water to be treated from the first water tank 81 to the circulation use activated carbon tower. Accordingly, there is the possibility that the system is sometimes unable to cope with a sudden increase in TOC density in the water to be treated. When the TOC density in the water to be treated is suddenly increased, the water conveyance use activated carbon tower 83 is loaded with a heavy load of the carbon compound treatment, and this may require the replacement of activated carbon in the water conveyance use activated carbon tower 83 depending on cases.

However, the present embodiment can be applied to the case where the TOC density of raw water is relatively low and the water quality is stable, so that an ultrapure water producing system capable of producing ultrapure water having a reduced amount of TOC and a low electrical conductivity can be provided at low cost.

Also, in the present embodiment, the rate of blow of a blower 90 and the rotating speed of an underwater stirrer 91 are inverter-controlled on the basis of a control signal from a controller 89 based on a signal from a TOC meter 88 provided for the second water tank 84, similar to the first embodiment.

<Fourth Embodiment>

Figure 5:
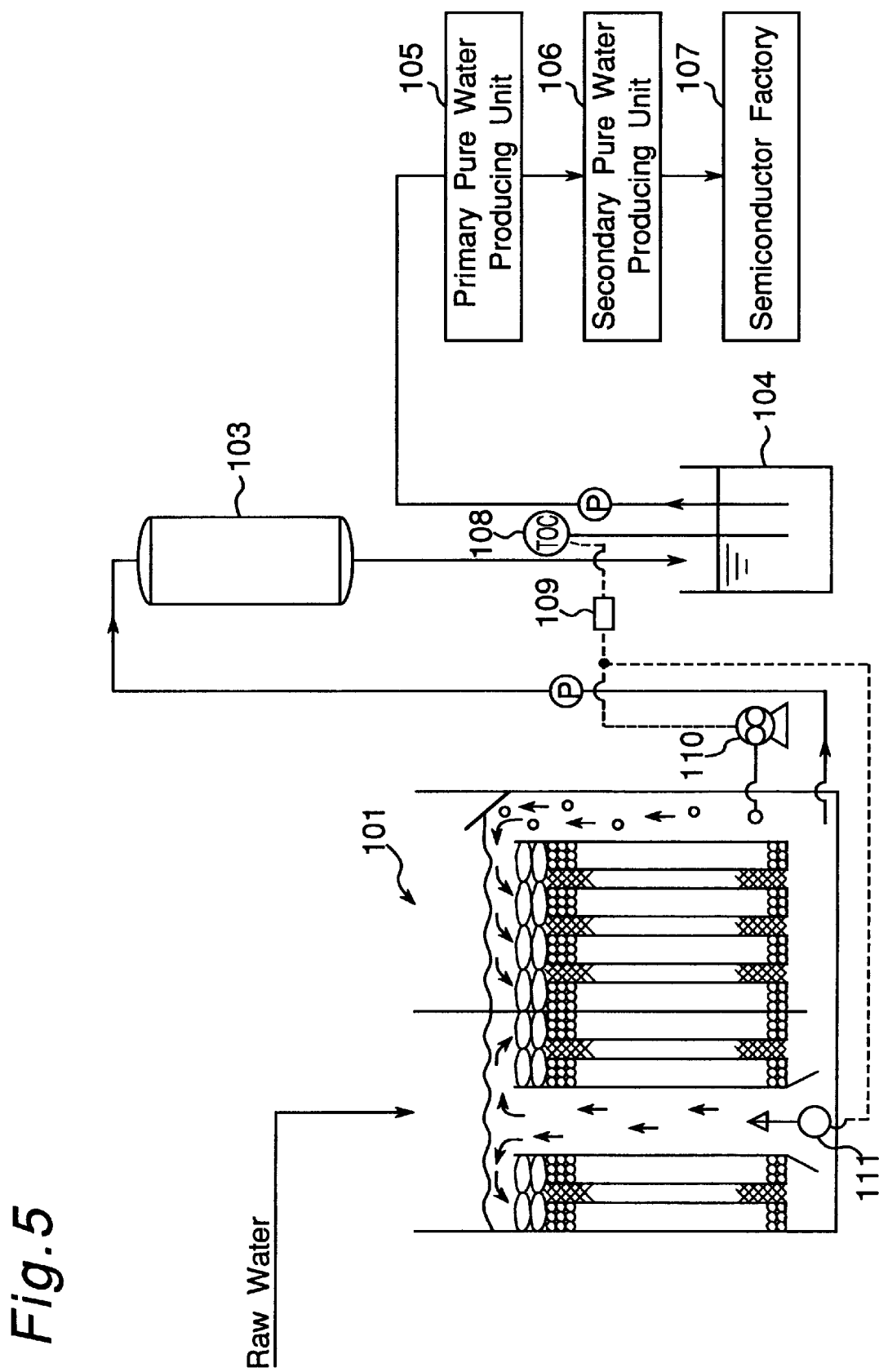
FIG. 5 is a schematic view showing an ultrapure water producing system different from those of FIG. 1 through FIG. 4.

FIG. 5 is a schematic view of an ultrapure water producing system according to the present embodiment. This ultrapure water producing system has a construction such that the collected water from the semiconductor factory 87 is not introduced into the ultrapure water producing system of the third embodiment shown in FIG. 4.

A first water tank 101, a water conveyance use activated carbon tower 103, a second water tank 104, a primary pure water producing unit 105, a secondary pure water producing unit 106 and a semiconductor factory 107 have constructions and operations similar to those of the first water tank 81, water conveyance use activated carbon tower 83, second water tank 84, primary pure water producing unit 85, secondary pure water producing unit 86 and semiconductor factory 87 shown in FIG. 4. Similar to the case of the third embodiment, the rate of blow of a blower 101 and the rotating speed of an underwater stirrer 111 are inverter-controlled on the basis of a control signal from a controller 109 based on a signal from a TOC meter 108 provided for the second water tank 104.

In the present embodiment, as de scribed above, the collected water from the semiconductor factory 107 is not introduced into the anaerobic organic matter treatment chamber of the first water tank 101. Therefore, the IPA and acetone in the low-concentration organic waste water from the semiconductor factory 107 cannot be utilized when denitrifying by the anaerobic microbe the nitrate nitrogen produced during the organic nitrogen compound treatment with the aerobic microbe. That is, the denitrifying performance with an abundance of organic nitrogen compounds in the water to be treated is worse than that of the third embodiment. However, by prolonging the retention time of the water to be treated in the first water tank 101 or taking another measure, the system can cope, to some extent, with the case of a small amount of organic nitrogen compounds in the water to be treated or a similar case. Therefore, the present embodiment can be applied to the case where a small amount of organic nitrogen compounds exist in the raw water, the TOC density is relatively low and the water quality is stable, so that an ultrapure water producing system capable of producing ultrapure water having a reduced amount of TOC and a low electrical conductivity can be provided at low cost.

<Fifth Embodiment>

Figure 6:
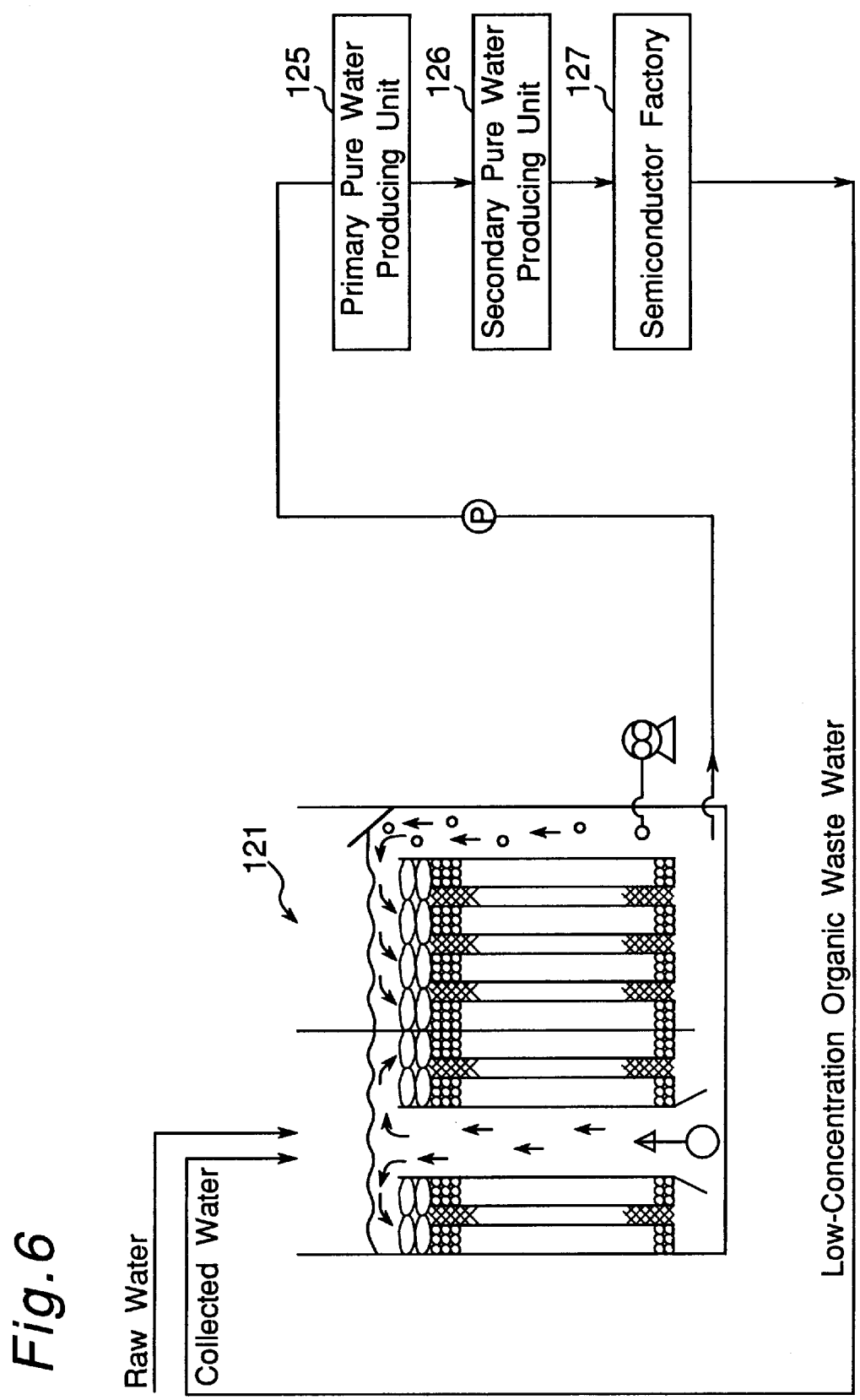
FIG. 6 is a schematic view showing an ultrapure water producing system different from those of FIG. 1 through FIG. 5.

FIG. 6 is a schematic view of an ultrapure water producing system according to the present embodiment. This ultrapure water producing system has a construction such that the water conveyance use activated carbon tower 83 and the second water tank 84 are removed from the ultrapure water producing system of the third embodiment shown in FIG. 4.

A first water tank 121, a primary pure water producing unit 125, a secondary pure water producing unit 126 and a semiconductor factory 127 have constructions and operations similar to those of the first water tank 81, primary pure water producing unit 85, secondary pure water producing unit 86 and semiconductor factory 87 shown in FIG. 4. It is to be noted that the TOC meter to be provided for the second water tank and the controller for outputting a control signal based on a signal from the TOC meter are also removed in accordance with the removal of the second water tank.

As described above, the present embodiment has none of the circulation use activated carbon tower, the circulating means for conveying the water to be treated from the first water tank 121 to the circulation use activated carbon tower, the water conveyance use activated carbon tower to which the water to be treated is conveyed from the first water tank 121, the second water tank and the control system for controlling the rate of circulation and the rate of stirring of water in the first water tank 121 on the basis of the TOC density of the second water tank. Therefore, this system cannot rapidly cope with a sudden increase in TOC density in the water to be treated.

However, the present embodiment can be applied to the case where the water quality of raw water is good and stable (practically, in the case where the TOC density is not higher than 1 ppm as in city water), so that an ultrapure water producing system capable of producing an ultrapure water having a reduced amount of TOC and a low electrical conductivity can be provided at low cost.

<Sixth Embodiment>

Figure 7:
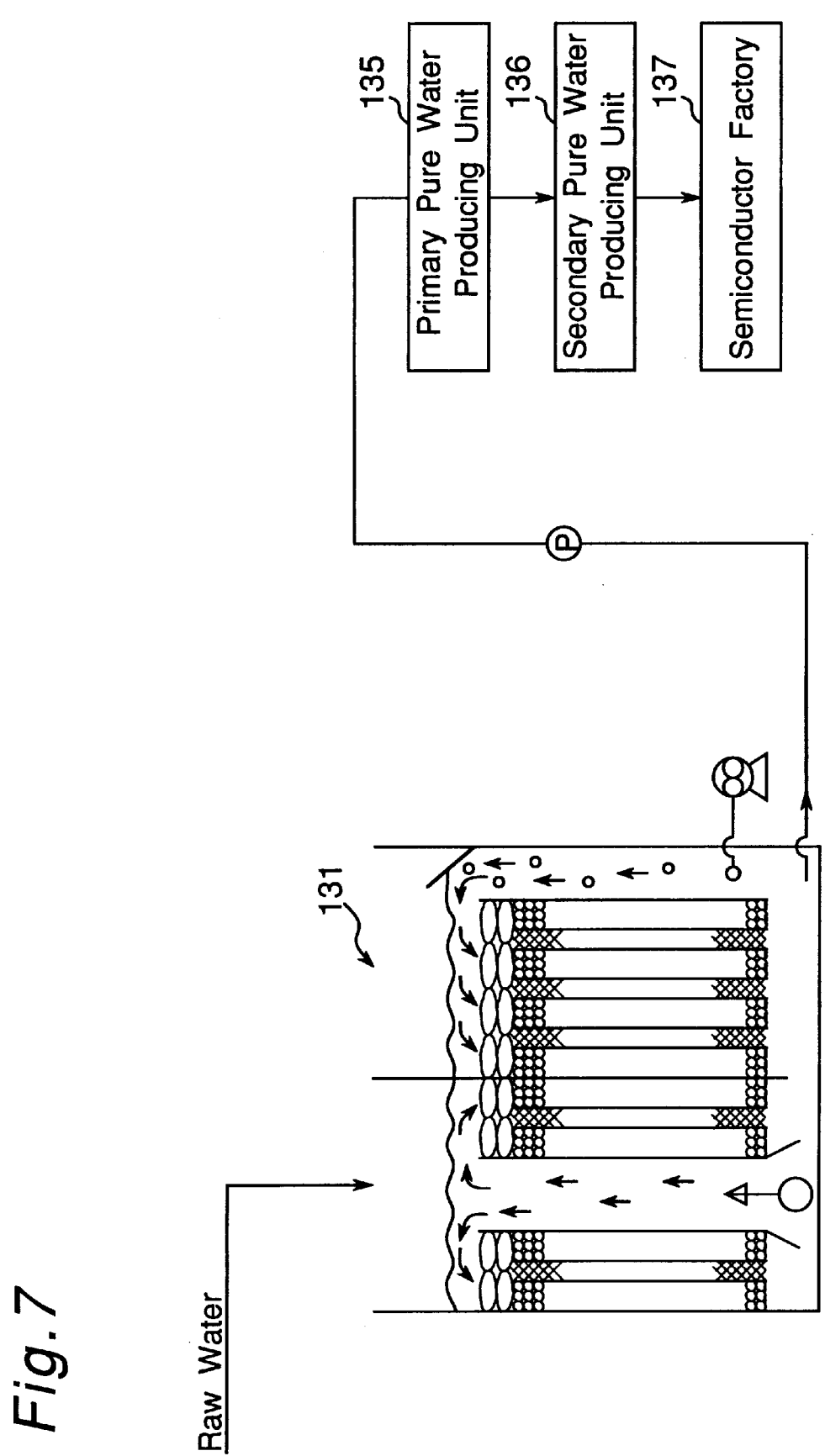
FIG. 7 is a schematic view showing an ultrapure water producing system different from those of FIG. 1 through FIG. 6.

FIG. 7 is a schematic view of an ultrapure water producing system according to the present embodiment. This ultrapure water producing system has a construction such that the collected water from the semiconductor factory 127 is not introduced into the ultrapure water producing system of the fifth embodiment shown in FIG. 6.

A first water tank 131, a primary pure water producing unit 135, a secondary pure water producing unit 136 and a semiconductor factory 137 have constructions and operations similar to those of the first water tank 121, primary pure water producing unit 125, secondary pure water producing unit 126 and semiconductor factory 127 shown in FIG. 6.

In the present embodiment, as described above, the collected water from the semiconductor factory 137 is not introduced into the anaerobic organic matter treatment chamber of the first water tank 131. Therefore, the IPA and acetone in the low-concentration organic waste water from the semiconductor factory 137 cannot be utilized when denitrifying by the anaerobic microbe the nitrate nitrogen produced during the organic nitrogen compound treatment with the aerobic microbe. That is, the denitrifying performance with an abundance of organic nitrogen compounds in the water to be treated is worse than that of the fifth embodiment. However, by prolonging the retention time of the water to be treated in the first water tank 131 or taking another measure, the system can cope, to some extent, with the case of a small amount of organic nitrogen compounds in the water to be treated or a similar case. Therefore, the present embodiment can be applied to the case where the water quality of raw water is good (for example, when the TOC density is not higher than 1 ppm and there is a small amount of organic nitrogen compounds) and stable, so that an ultrapure water producing system capable of producing ultrapure water having a reduced amount of TOC and a low electrical conductivity can be provided at low cost.

<Seventh Embodiment>

Figure 8:
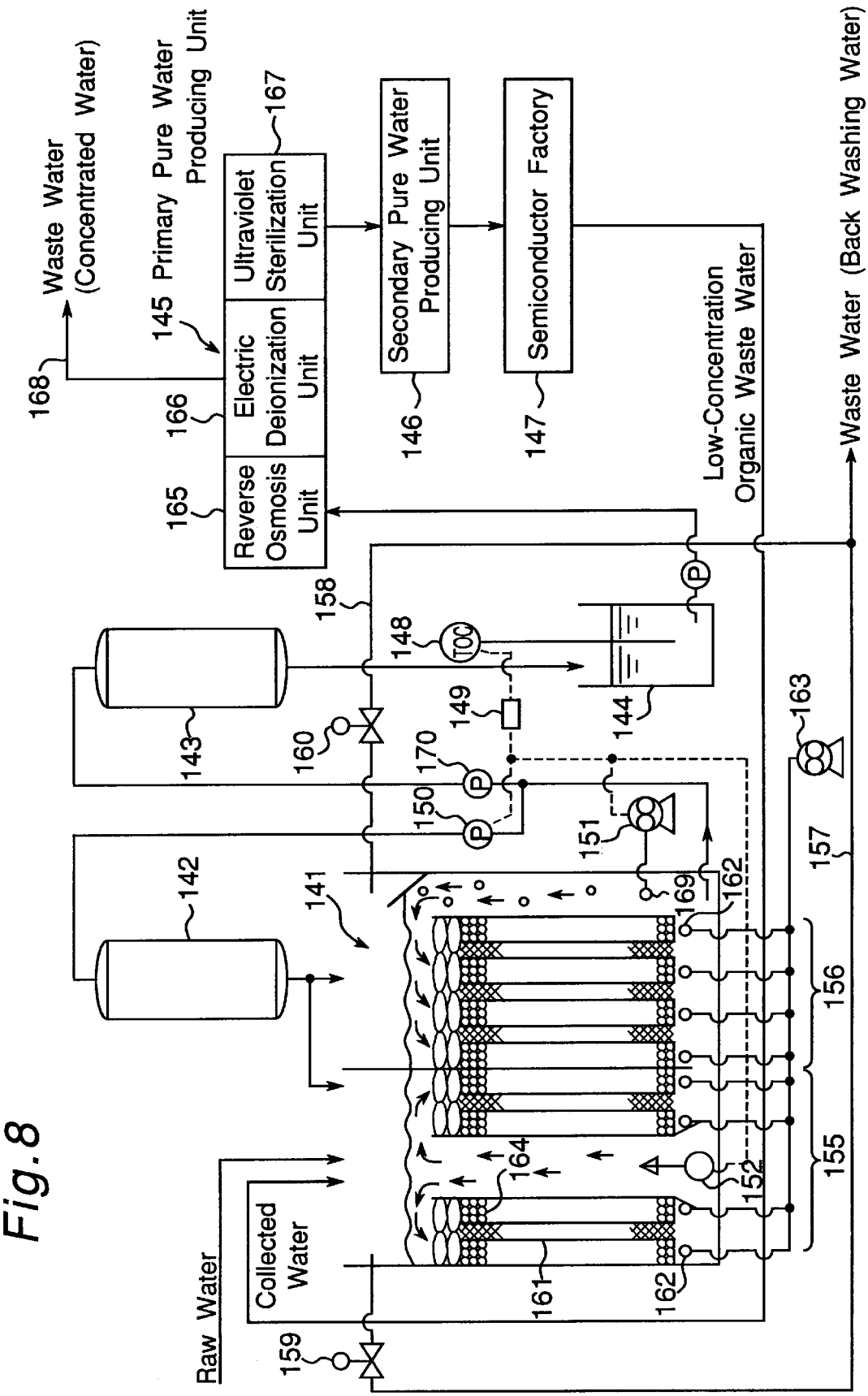
FIG. 8 is a schematic view of an ultrapure water producing system including an electric deionization unit in its primary pure water producing unit.

FIG. 8 is a schematic view of an ultrapure water producing system according to the present embodiment. This ultrapure water producing system has a construction such that particularly the primary pure water producing unit 35 in the ultrapure water producing system of the first embodiment shown in FIG. 1 has a varied construction.

A first water tank 141, a circulation use activated carbon tower 142, a water conveyance use activated carbon tower 143, a second water tank 144, a secondary pure water producing unit 146 and a semiconductor factory 147 have constructions and operations similar to those of the first water tank 31, circulation use activated carbon tower 32, water conveyance use activated carbon tower 33, second water tank 34, secondary pure water producing unit 36 and semiconductor factory 37 shown in FIG. 1. Similar to the case of the first embodiment, the rate of discharge of an activated carbon tower circulation pump 150, the rate of blow of a blower 151 and the rotating speed of an under-water stirrer 152 are inverter-controlled on the basis of a control signal from a controller 149 based on a signal from a TOC meter 148 provided for the second water tank 144.

In the present embodiment, one end of a back washing drain pipe 157 is connected to an uppermost portion of an anaerobic organic matter treatment chamber 155 with interposition of a solenoid valve 159. Likewise, one end of a back washing drain pipe 158 is connected to an uppermost portion of the aerobic organic matter treatment chamber 156 with interposition of a solenoid valve 160. An air diffusion pipe 162 is provided between tubular nets 161 at bottom portions of the anaerobic organic matter treatment chamber 155 and the aerobic organic matter treatment chamber 156, discharging air from the back washing blower 163 toward a lower portion stowed with Bincho charcoal.

A primary pure water producing unit 145 into which the water to be treated is introduced from the second water tank 144 is constituted by an RO unit 165, an electric deionization unit 166 and an ultraviolet sterilization unit 167. The electric deionization unit 166 has a construction such that cation exchange resin and anion exchange resin are stowed in a cation exchange membrane and an anion exchange membrane, respectively. Then, the ions in the water to be treated are adsorbed by both the ion exchange resins, and the deionized water to be treated is supplied to the ultraviolet sterilization unit 167 of the next process. On the other hand, the ions adsorbed by both the ion exchange resins move through the ion exchange resins, as a consequence of which the cations and anions are discharged as concentrated water having a high ion concentration via pipe 168 from the cation exchange membrane side and the anion exchange membrane side, respectively.

As described above, both the ion exchange resins are continuously regenerated by electricity in the electric deionization unit 166 and discharged as concentrated water, and this obviates the need for any special regenerating treatment by means of a chemical or the like. In contrast to this, the primary pure water producing unit of the ultrapure water producing system of the first embodiment shown in FIG. 1 is constituted by the normal reverse osmosis unit, ion exchange unit, ultraviolet sterilization unit and so on. In this case, the ion exchange unit requires a regenerating treatment by a chemical such as hydrochloric acid that serves as acid or sodium hydroxide that serves as alkali, and the resulting regenerated waste water must be treated.

In order to take advantage of the electric deionization unit 166, it is required to treat as much as possible by the pretreatment the organic matters and the dissolved gas (carbon dioxide gas) that reduces the deionizing function while adhering on the ion exchange resins and the ion exchange membrane. Then, the pretreatment unit of the present embodiment has the same construction as that of the first embodiment, and this allows the water of a stabilized quality to be supplied to the primary pure water producing unit 145 while suppressing the TOC of the pretreated water to a density of not higher than 1 ppm, reducing the electrical conductivity and adjusting the change in water quality of the influent water. The remaining carbon dioxide gas in the water to be treated is removed by being dissipated into the air by the aeration from an air diffusion pipe 169 of the aerobic organic matter treatment chamber 156 in the first water tank 141. Therefore, according to the present embodiment, there can be produced ultrapure water having a reduced amount of TOC and a low electrical conductivity at low cost by means of the primary pure water producing unit 145 having the electric deionization unit 166 that requires neither the provision of a membrane filter unit or the like between the above pretreatment unit (second water tank 144) and the primary pure water producing unit 145 nor the regenerating treatment by a chemical (i.e., requiring no regenerated waste water treatment).

In the above construction, the biofilm formed on the fillers in the anaerobic organic matter treatment chamber 155 and the aerobic organic matter treatment chamber 156 is biofilm that the microbes have formed by using the organic matters and various ions in the water to be treated as a nutrient. Therefore, the separation and floating in the water to be treated of the biofilm are not preferable in the present embodiment particularly provided downstream with the primary pure water producing unit 145 having the RO unit 165 and the electric deionization unit 166. Therefore, in the present embodiment, the biofilm is removed by performing back washing as follows every specified period of time. It is to be noted that the above specified period of time is determined depending on the states of the thickness and so on of the biofilm formed on the fillers of the anaerobic organic matter treatment chamber 155. In practice, the specified period is, for example, seven days, and the back washing time in the case is two hours.

First, the water level of the first water tank 141 is elevated by not less than 1 m from the position where the one end of the back washing drain pipes 157 and 158 are connected, and supply of raw water is stopped. Further, the operations of an activated carbon tower circulation pump 150, an activated carbon tower water conveyance pump 170, a blower 151 and an underwater stirrer 152 are stopped. Thereafter, the back washing blower 163 is operated to separate the biofilm formed on the fillers inside the first water tank 141 and the microbes adhering on the fillers by air back washing.

Thus, by sufficiently separating the biofilm, the solenoid valves 159 and 160 are opened in a state in which the back washing blower 163 is operated, and the back washing water including the separated biofilm is discharged from the other end of the back washing drain pipes 157 and 158. When the water level of the first water tank 141 becomes lower than the position of connection of the back washing drain pipes 157 and 158, raw water is introduced in a state in which the back washing blower 163 is operated. By this operation, the remaining biofilm and the like are discharged from the back washing drain pipes 157 and 158 while being mixed with the raw water. Thus, after a lapse of a specified time when the water quality of the first water tank 141 becomes equivalent to the water quality of the raw water, the back washing blower 163 is stopped and the solenoid valves 159 and 160 are closed.

Then, the activated carbon tower circulation pump 150, the blower 151 and the underwater stirrer 152 are operated, thereby circulating the water to be treated in the first water tank 141 via the circulation use activated carbon tower 142. Then, an activated carbon tower water conveyance pump 170 is operated after a lapse of a specified time when the water quality is stabilized, thereby introducing the water to be treated into the water conveyance use activated carbon tower 143 for the start of the normal operation of the pretreatment unit.

Thus, by performing the aforementioned back washing every specified period in the present embodiment, the biofilm formed on the fillers inside the first water tank 141 and the microbes adhering on the fillers are forcedly separated to allow the same to be discharged out of the ultrapure water producing system. Therefore, the biofilm that will naturally come off if untreated to flow as organic matters and various ions in the water to be treated are removed in the early stage, so that ultrapure water having a smaller amount of TOC and a lower electrical conductivity can be produced. It is to be noted that the back washing blower 163 is not required to be a specifically limited blower but allowed to be an ordinary blower.

<Eighth Embodiment>

Figure 9:
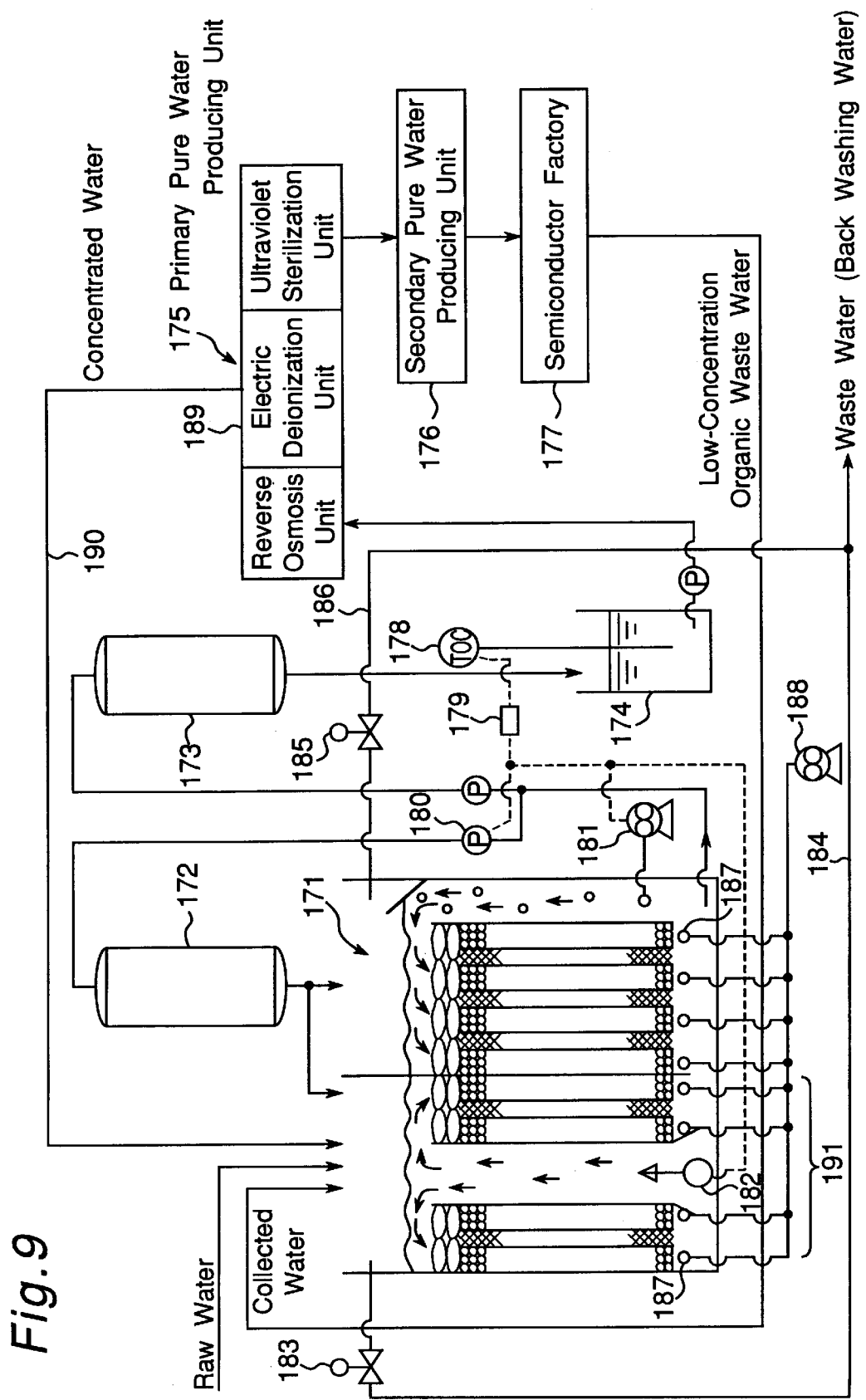
FIG. 9 is a schematic view of an ultrapure water producing system including an electric deionization unit in its primary pure water producing unit different from that of FIG. 8.

FIG. 9 is a schematic view of an ultrapure water producing system according to the present embodiment. This ultrapure water producing system has a construction such that the concentrated water from the electric deionization unit 166 of the primary pure water producing unit 145 is conveyed back to the anaerobic organic matter treatment chamber 155 in the ultrapure water producing system of the seventh embodiment shown in FIG. 8.

A first water tank 171, a circulation use activated carbon tower 172, a water conveyance use activated carbon tower 173, a second water tank 174, a primary pure water producing unit 175, a secondary pure water producing unit 176 and a semiconductor factory 177 have constructions and operations similar to those of the first water tank 141, circulation use activated carbon tower 142, water conveyance use activated carbon tower 143, second water tank 144, primary pure water producing unit 145, secondary pure water producing unit 146 and semiconductor factory 147 shown in FIG. 8. Similar to the case of the seventh embodiment, the rate of discharge of an activated carbon tower circulation pump 180, the rate of blow of a blower 181 and the rotating speed of an underwater stirrer 182 are inverter-controlled on the basis of a control signal from a controller 179 based on a signal from a TOC meter 178 provided for the second water tank 174. Further, back washing is performed by a solenoid valve 183, a back washing drain pipe 184, a solenoid valve 185, a back washing drain pipe 186, an air diffusion pipe 187 and a back washing blower 188.

In the present embodiment, the concentrated water that has been concentrated by an electric deionization unit 189 of the primary pure water producing unit 175 is conveyed back to an anaerobic organic matter treatment chamber 191 of the first water tank 171 by a pipe 190. By thus reusing the waste water of the electric deionization unit 189, the total utilization factor of water can be improved.

<Ninth Embodiment>

Figure 10:
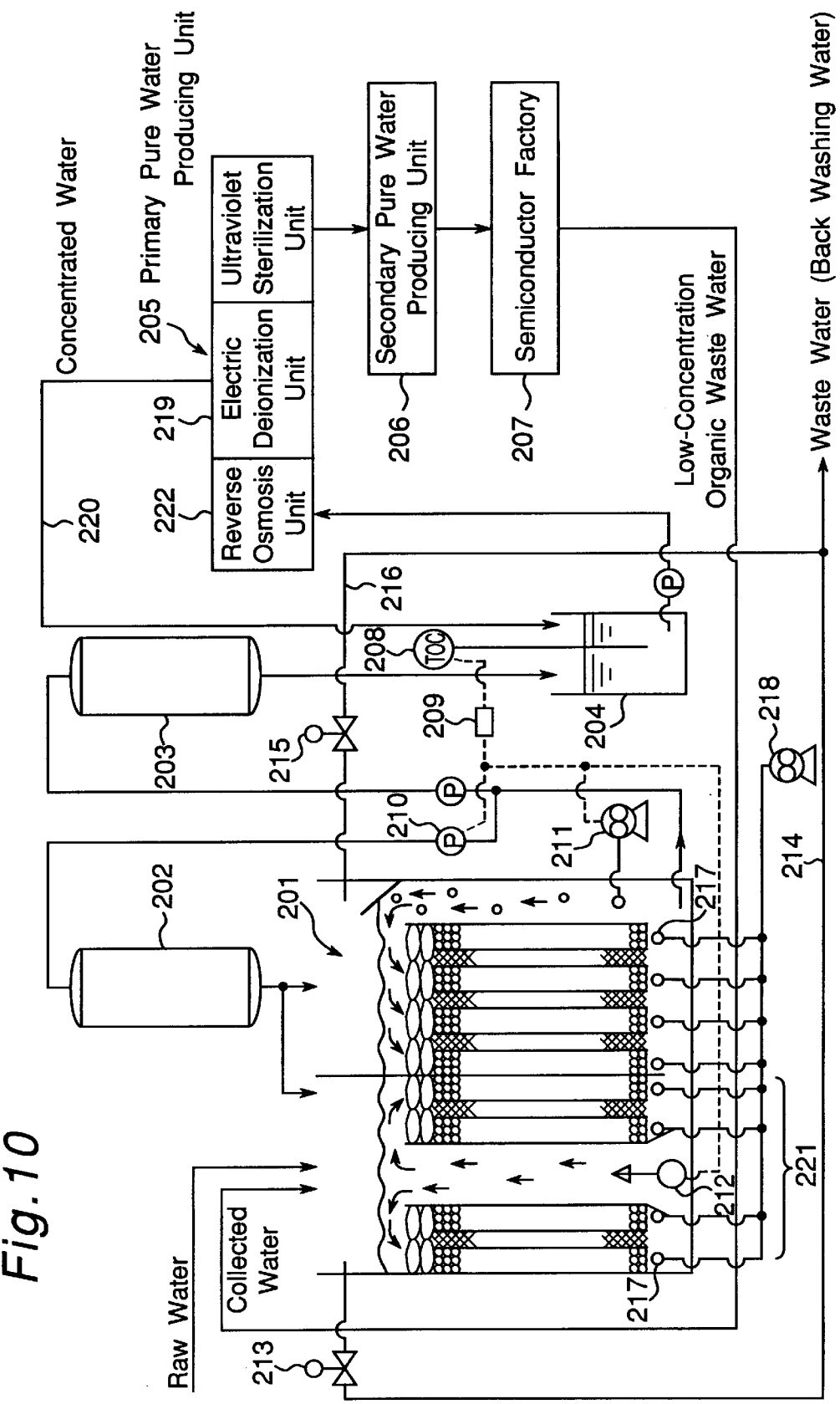
FIG. 10 is a schematic view of an ultrapure water producing system including an electric deionization unit in its primary pure water producing unit different from those of FIG. 8 and FIG. 9.

FIG. 10 is a schematic view of an ultrapure water producing system according to the present embodiment. This ultrapure water producing system has a construction such that the concentrated water from the first electric deionization unit 189 of the primary pure water producing unit 175 is conveyed back to the second water tank 174 in the ultrapure water producing system of the eighth embodiment shown in FIG. 9.

A first water tank 201, a circulation use activated carbon tower 202, a water conveyance use activated carbon tower 203, a second water tank 204, a primary pure water producing unit 205, a secondary pure water producing unit 206 and a semiconductor factory 207 have constructions and operations similar to those of the first water tank 171, circulation use activated carbon tower 172, water conveyance use activated carbon tower 173, second water tank 174, primary pure water producing unit 175, secondary pure water producing unit 176 and semiconductor factory 177 shown in FIG. 9. Similar to the case of the eighth embodiment, the rate of discharge of an activated carbon tower circulation pump 210, the rate of blow of a blower 211 and the rotating speed of an underwater stirrer 212 are inverter-controlled on the basis of a control signal from a controller 209 based on a signal from a TOC meter 208 provided for the second water tank 204. Further, back washing is performed by a solenoid valve 213, a back washing drain pipe 214, a solenoid valve 215, a back washing drain pipe 216, an air diffusion pipe 217 and a back washing blower 218.

In the present embodiment, the concentrated water from an electric deionization unit 219 of the primary pure water producing unit 205 is conveyed back to the second water tank 204 by a pipe 220. Substances to be removed when the concentrated water is reused for producing ultrapure water include ions and organic matters. If both the substances are included in the concentrated water, then the concentrated water is required to be conveyed back to an anaerobic organic matter treatment chamber 221 of the first water tank 201 as in the eighth embodiment for the removal of the organic matters. However, when only ions are included in the concentrated water, the above operation is not always required to be performed, and merely by conveying the water back to the second water tank 204, the included ions are treated by a reverse osmosis unit 222 of the primary pure water producing unit 205.

By thus conveying the concentrated water of the electric deionization unit 219 back to the second water tank 204, the waste water can be efficiently circulated, and the capacity of the first water tank 201 can be made smaller than the capacity of the first water tank 171 of the eighth embodiment.

<Tenth Embodiment>

Figure 11:
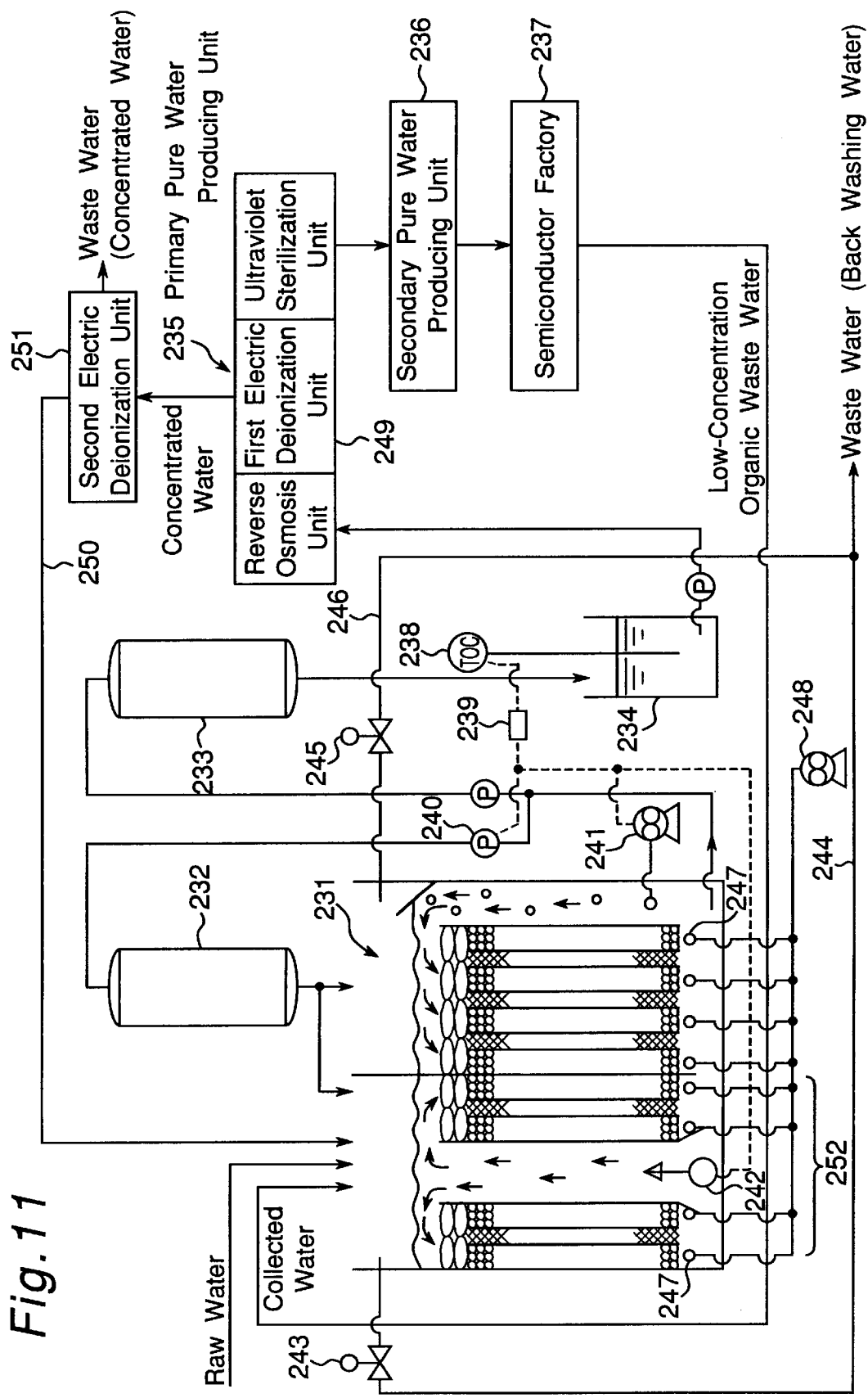
FIG. 11 is a schematic view of an ultrapure water producing system including an electric deionization unit in its primary pure water producing unit different from those of FIG. 8 through FIG. 10.

FIG. 11 is a schematic view of an ultrapure water producing system according to the present embodiment. This ultrapure water producing system has a construction such that a second electric deionization unit is interposed in a pipe 190 for conveying the concentrated water from the first electric deionization unit 189 of the primary pure water producing unit 175 back to an anaerobic organic matter treatment chamber 191 in the ultrapure water producing system of the eighth embodiment shown in FIG. 9.

A first water tank 231, a circulation use activated carbon tower 232, a water conveyance use activated carbon tower 233, a second water tank 234, a primary pure water producing unit 235, a secondary pure water producing unit 236 and a semiconductor factory 237 have constructions and operations similar to those of the first water tank 171, circulation use activated carbon tower 172, water conveyance use activated carbon tower 173, second water tank 174, primary pure water producing unit 175, secondary pure water producing unit 176 and semiconductor factory 177 shown in FIG. 9. Similar to the case of the eighth embodiment, the rate of discharge of an activated carbon tower circulation pump 240, the rate of blow of a blower 241 and the rotating speed of an underwater stirrer 242 are inverter-controlled on the basis of a control signal from a controller 239 based on a signal from a TOC meter 238 provided for the second water tank 234. Further, back washing is performed by a solenoid valve 243, a back washing drain pipe 244, a solenoid valve 245, a back washing drain pipe 246, an air diffusion pipe 247 and a back washing blower 248.

In the present embodiment, as described above, a second electric deionization unit 251 is interposed in a pipe 250 for conveying the concentrated water from a first electric deionization unit 249 of the primary pure water producing unit 235 back to an anaerobic organic matter treatment chamber 252 of the first water tank 231. Then, the concentrated water from a second electric deionization unit 251 is discharged outward as waste water, and the deionized water is conveyed back to the anaerobic organic matter treatment chamber 252.

By thus deionizing the concentrated water from the first electric deionization unit 249 in the second electric deionization unit 251 and conveying the resulting water back to the anaerobic organic matter treatment chamber 252, the ionic load of the anaerobic organic matter treatment chamber 252 is reduced. Therefore, the frequency of back washing can be reduced, so that a time contributing to the production of pure water can be prolonged.

<Eleventh Embodiment>

Figure 12:
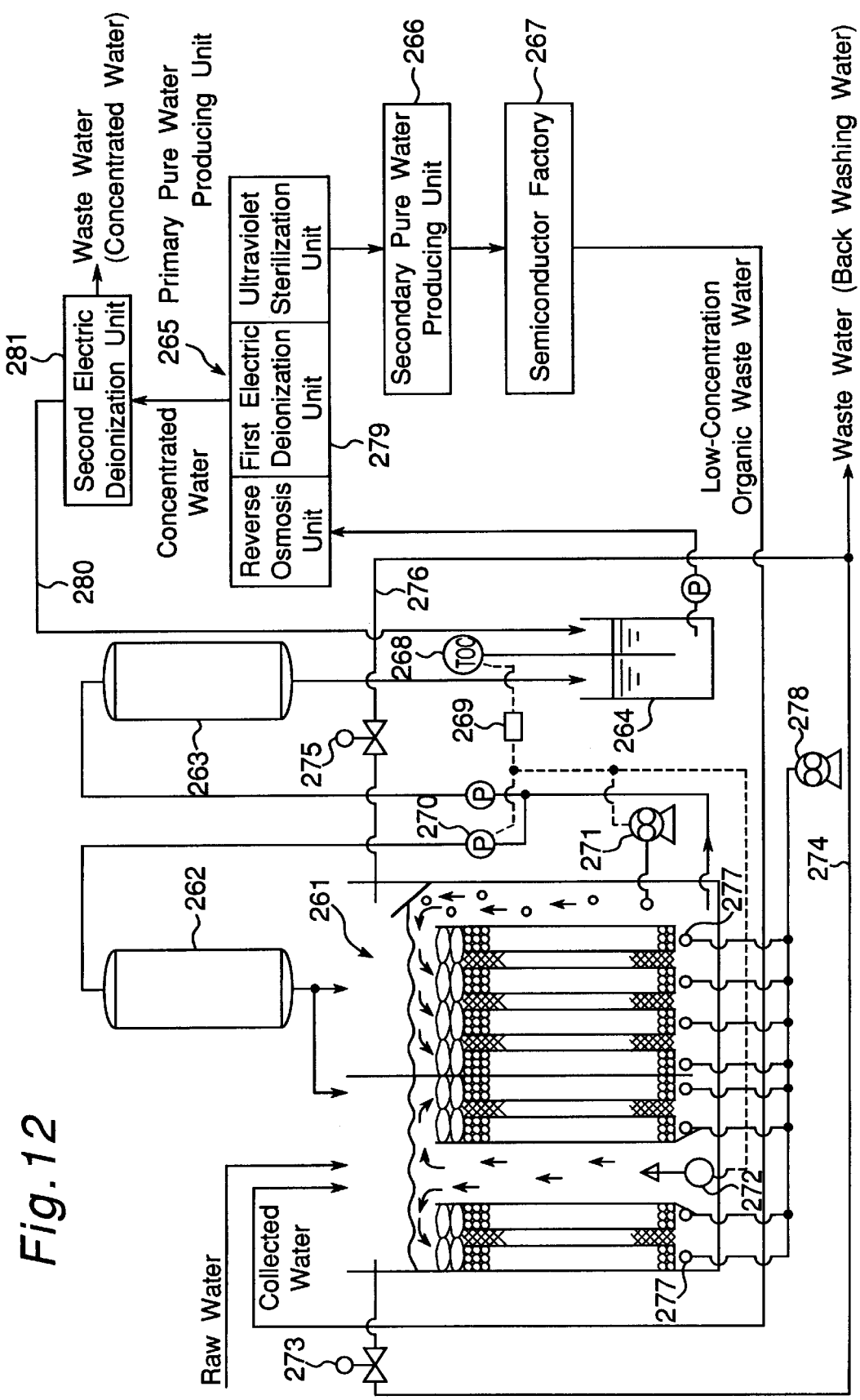
FIG. 12 is a schematic view of an ultrapure water producing system including an electric deionization unit in its primary pure water producing unit different from those of FIG. 8 through FIG. 11.

FIG. 12 is a schematic view of an ultrapure water producing system according to the present embodiment. This ultrapure water producing system has a construction such that the water deionized by the second electric deionization unit 251 is conveyed back to the second water tank 234 in the ultrapure water producing system of the tenth embodiment shown in FIG. 11.

A first water tank 261, a circulation use activated carbon tower 262, a water conveyance use activated carbon tower 263, a second water tank 264, a primary pure water producing unit 265, a secondary pure water producing unit 266 and a semiconductor factory 267 have constructions and operations similar to those of the first water tank 231, circulation use activated carbon tower 232, water conveyance use activated carbon tower 233, second water tank 234, primary pure water producing unit 235, secondary pure water producing unit 236 and semiconductor factory 237 shown in FIG. 11. Similar to the case of the tenth embodiment, the rate of discharge of an activated carbon tower circulation pump 270, the rate of blow of a blower 271 and the rotating speed of an underwater stirrer 272 are inverter-controlled on the basis of a control signal from a controller 269 based on a signal from a TOC meter 268 provided for the second water tank 264. Further, back washing is performed by a solenoid valve 273, a back washing drain pipe 274, a solenoid valve 275; a back washing drain pipe 276, an air diffusion pipe 277 and a back washing blower 278.

In the present embodiment, as described above, the concentrated water from a first electric deionization unit 279 of the primary pure water producing unit 265 is deionized by a second electric deionization unit 281 and thereafter conveyed back to the second water tank 264 by a pipe 280.

The water obtained by deionizing the concentrated water from the first electric deionization unit 279 by the second electric deionization unit 281 is the water having an excellent water quality obtained by further deionizing two times the water to be treated having a stable water quality as a result of reducing the TOC to a density of not higher than 1 ppm, reducing the electrical conductivity and adjusting the water quality of influent water by the pretreatment unit having the same basic construction as that of the first embodiment. Accordingly, there is no need for deliberately conveying such water of a good water quality back to the first water tank 261 and is allowed to be conveyed back to the second water tank 264. By thus conveying the waste water from the second electric deionization unit 281 back to the second water tank 264, the capacity of the first water tank 261 can be made smaller than the capacity of the first water tank 231 of the tenth embodiment that conveys the water back to the anaerobic organic matter treatment chamber 252 in terms of the retention time of the water to be treated.

Figure 13:
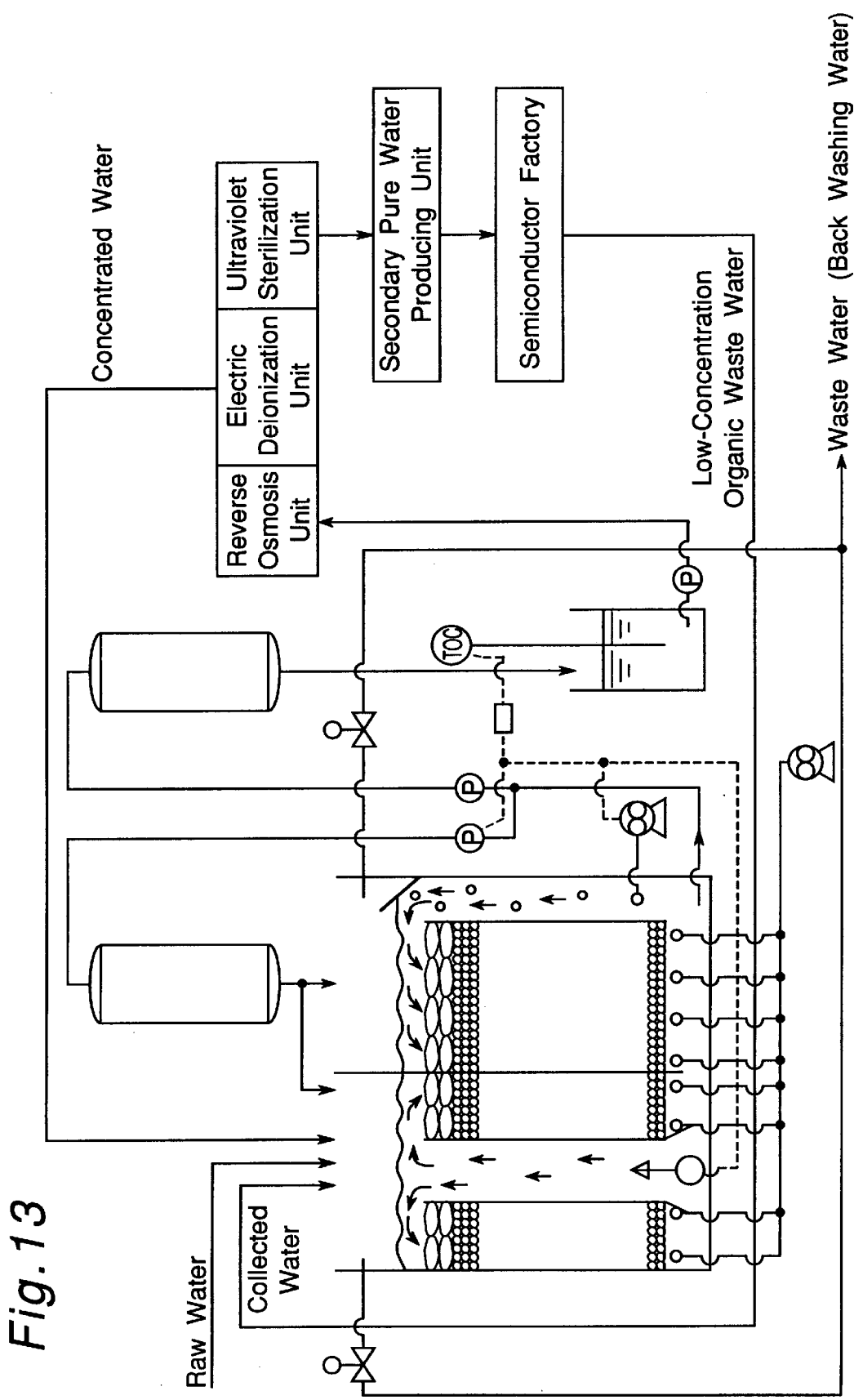
FIG. 13 is a schematic view of an ultrapure water producing system including an electric deionization unit in its primary pure water producing unit different from those of FIG. 8 through FIG. 12.
Figure 14:
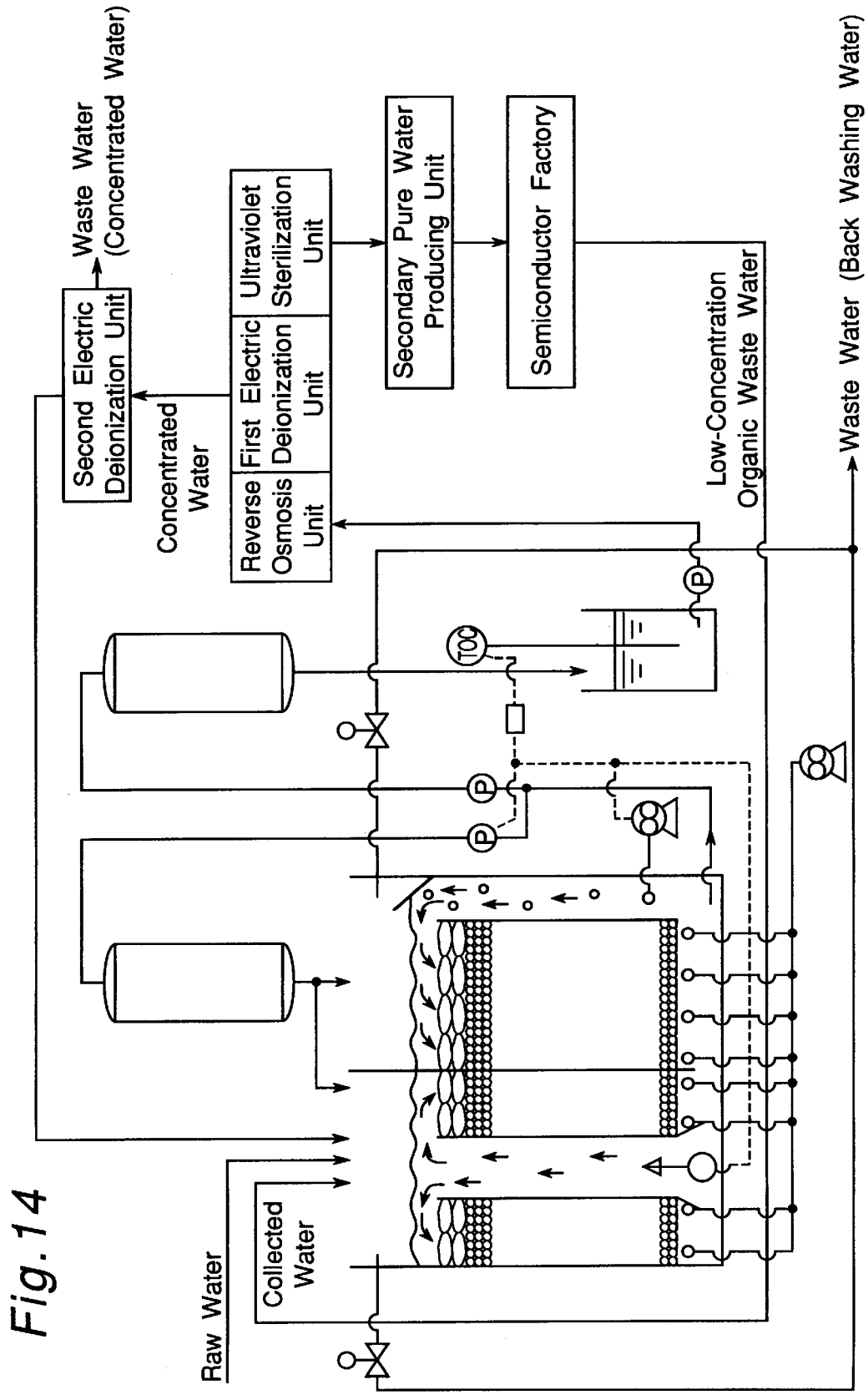
FIG. 14 is a schematic view of an ultrapure water producing system including an electric deionization unit in its primary pure water producing unit different from those of FIG. 8 through FIG. 13.

Also in the case of the ultrapure water producing systems of the seventh embodiment through the eleventh embodiment, the tubular nets inside the first water tanks 141, 171, 201, 231 and 261 can be removed as in the ultrapure water producing system shown in FIG. 2. FIG. 13 is a schematic view of an ultrapure water producing system obtained by removing the tubular nets from the ultrapure water producing system shown in FIG. 9. FIG. 14 is a schematic view of an ultrapure water producing system obtained by removing the tubular nets from the ultrapure water producing system shown in FIG. 11. As described above, when no tubular nets are provided inside the first water tanks 141, 171, 201, 231 and 261, the Bincho charcoal can be stowed more by the volume of the tubular nets, and therefore, the treatment efficiency of the water to be treated can be improved. Particularly when the water quality of the raw water and the water quality of the low-concentration organic waste water are good, the clogging due to the propagation of the microbes is hard to occur, meaning that the tubular nets should preferably be eliminated.

Figure 15:
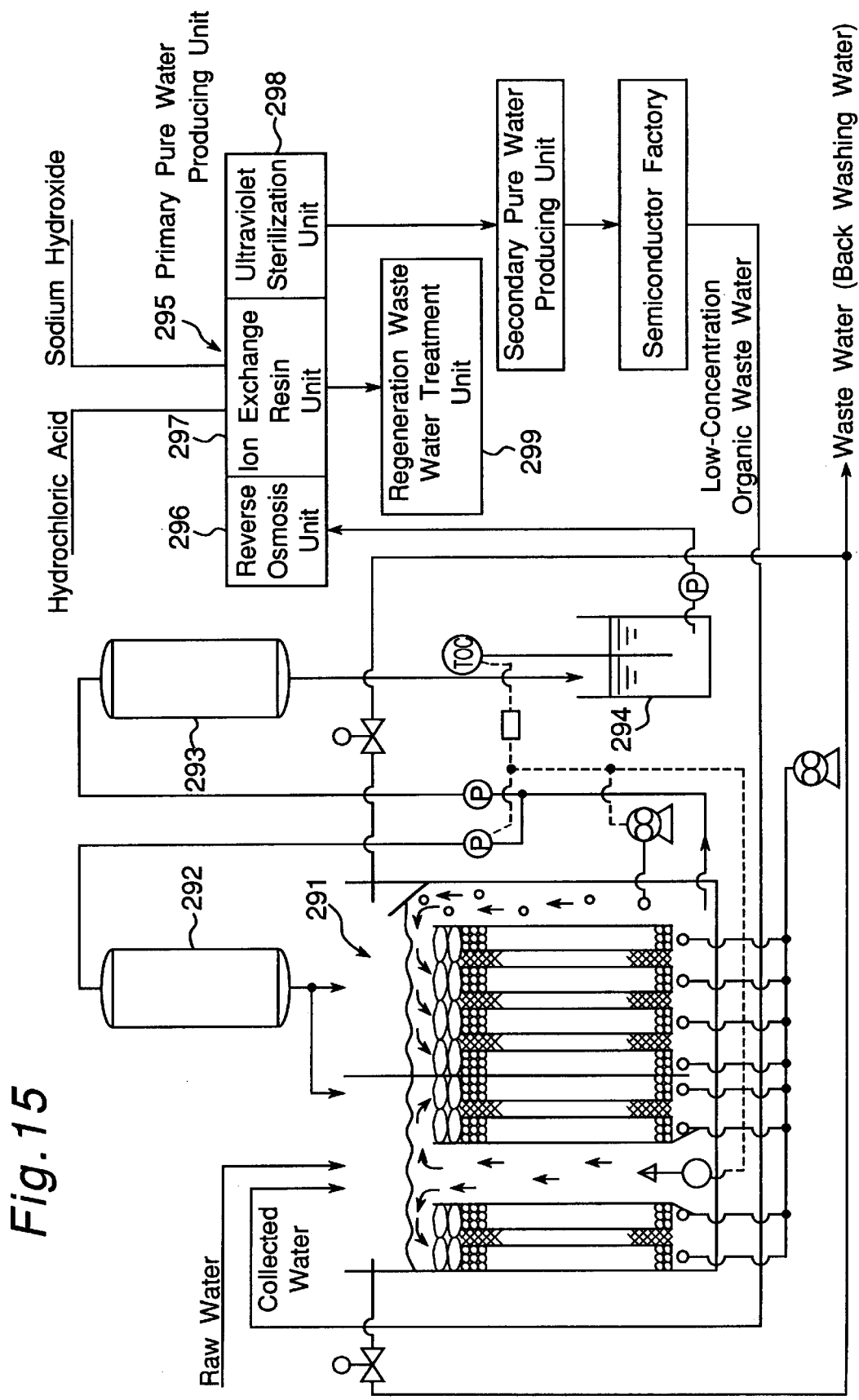
FIG. 15 is a schematic view of an ultrapure water producing system having an ion exchange resin unit in its primary pure water producing unit.
Figure 16A:
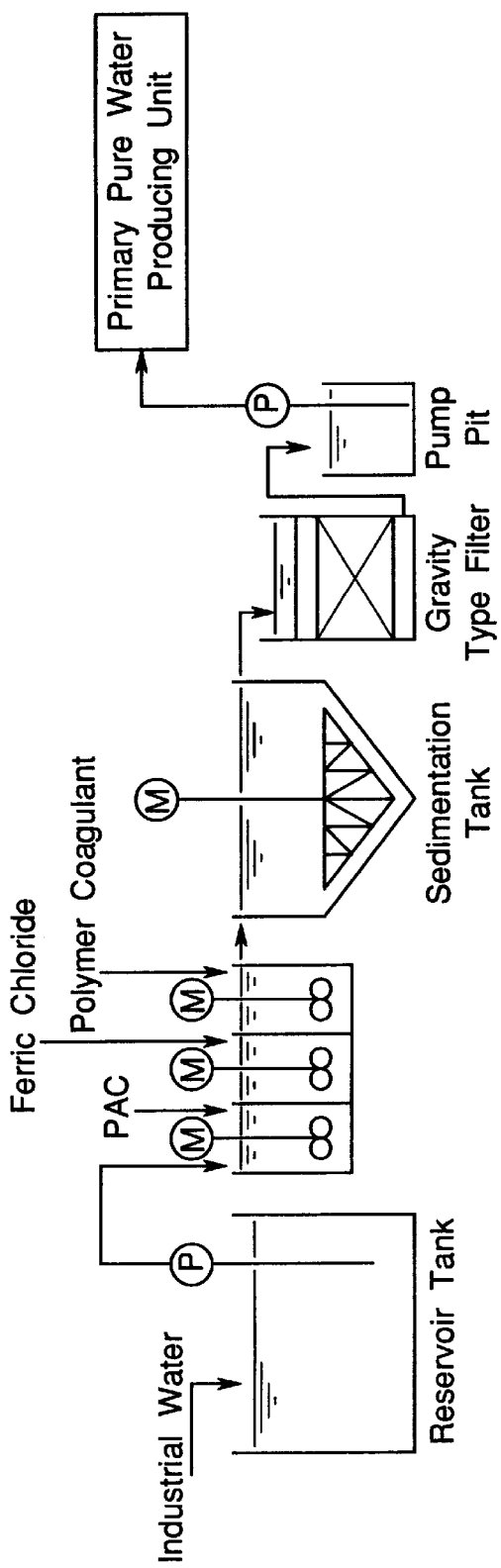
FIGS. 16A and 16B are views showing concrete examples of the pretreatment unit of a prior art ultrapure water producing system.
Figure 16B:
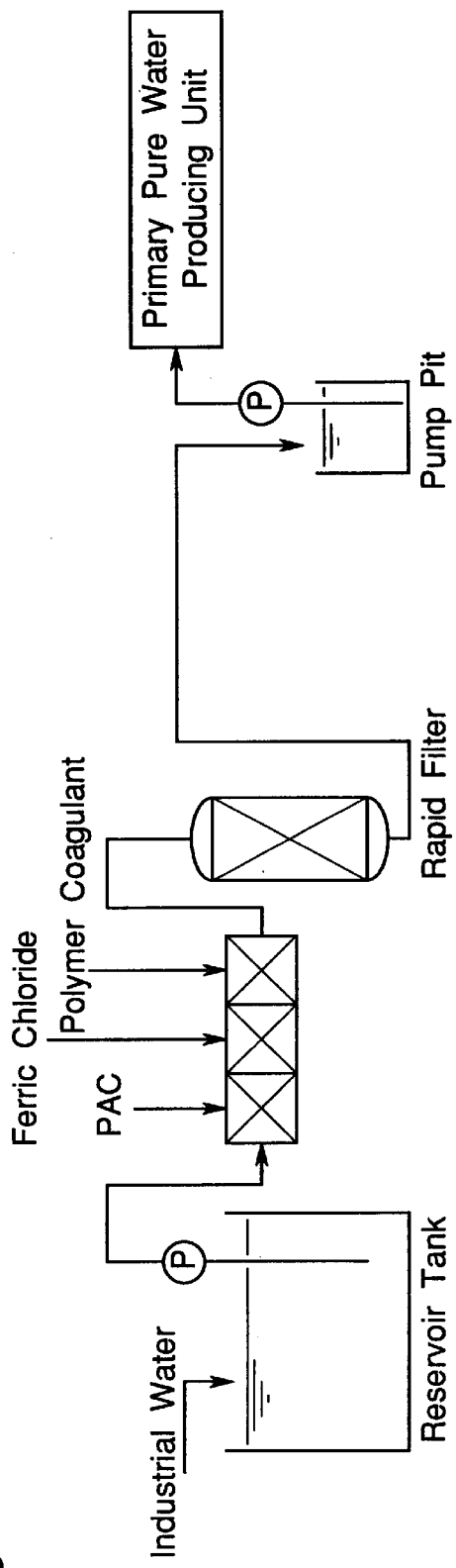
Figure 17:
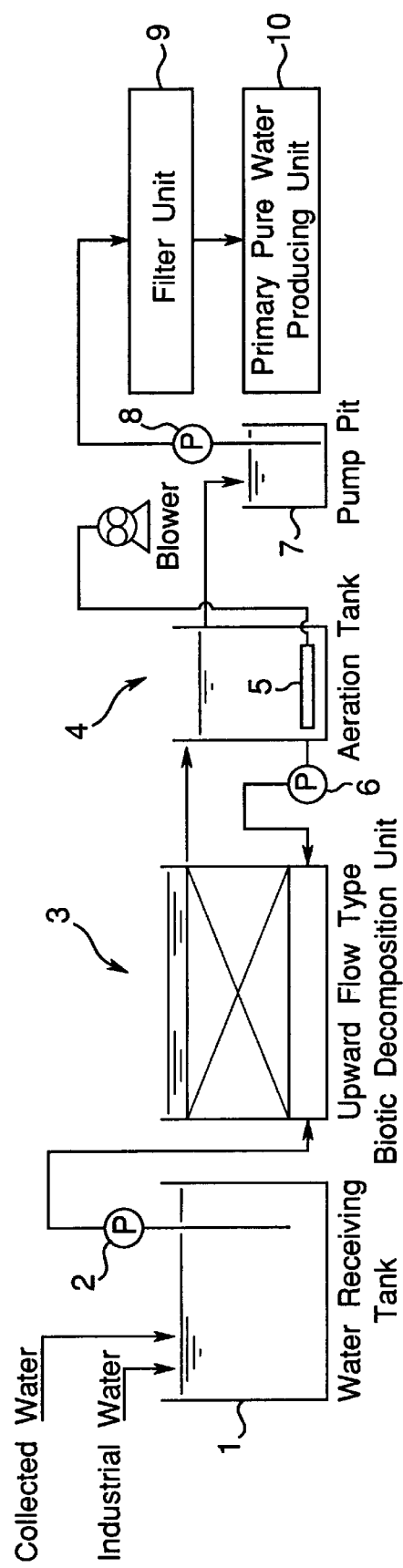
FIG. 17 is a schematic view of a prior art ultrapure water producing system for performing pretreatment by means of a microbe.

FIG. 15 show an ultrapure water producing system obtained by replacing the primary pure water producing unit 145 constructed of the RO unit 165, the electric deionization unit 166 and the ultraviolet sterilization unit 167 in the ultrapure water producing system shown in FIG. 8 with a primary pure water producing unit 295 constructed of an RO unit 296, an ion exchange resin unit 297 and an ultraviolet sterilization unit 298. In this case, the ion exchange resin is required to be regenerated by means of a chemical such as hydrochloric acid or sodium hydroxide as stated before, and water to be regenerated is inevitably produced. Therefore, a regeneration waste water treatment unit 299 for neutralizing the water to be regenerated is necessary. Therefore, an initial cost for the regeneration waste water treatment unit 299 and a running cost for neutralizing the water to be regenerated are further necessary.

In this case, the pretreatment unit in the ultrapure water producing system shown in FIG. 15 is constructed of a first water tank 291, a circulation use activated carbon tower 292, a water conveyance use activated carbon tower 293 and a second water tank 294, having the same basic construction as that of the pretreatment unit of the first embodiment. Therefore, the total construction of the ultrapure water producing system shown in FIG. 15 can be regarded as basically the same as the ultrapure water producing system of the first embodiment. Therefore, the ultrapure water producing system shown in FIG. 15 can cope with a change in water quality (for example, a sudden increase in TOC density) for some reason, also allowing ultrapure water having a TOC density of not higher than 0.5 ppb and a low electrical conductivity to be produced.

EXAMPLES

Concrete examples of the production of ultrapure water by means of the above ultrapure water producing system will be described next. The ultrapure water producing system used here was an ultrapure water producing system having a construction identical to that of the ultrapure water producing system shown in FIG. 1, in which the capacity of the first water tank 31 was set to about 1300 m$^3$, the capacity of the second water tank 34 was set to 100 m$^3$, the capacity of the circulation use activated carbon tower 32 was set to 15 m$^3$ and the capacity of the water conveyance use activated carbon tower 33 was set to 15 m$^3$.

By using this ultrapure water producing system, water to be treated having an electrical conductivity of 186 μs/cm, a TOC density of 2.2 ppm, a potassium permanganate consumption rate of 5.9 ppm, serving as an index of the amount of organic matters, was subjected to a pretreatment. As a result, the water to be treated from the second water tank 34 was able to have an electrical conductivity of 148 μs/cm, a TOC density of 0.3 ppm and a potassium permanganate consumption rate (organic matter) of 1.0 ppm. Then, this water to be treated was introduced into the primary pure water producing unit 35 for the production of ultrapure water, there was able to be obtained ultrapure water having a TOC density of not higher than 0.5 ppb from the secondary pure water producing unit 36.

Therefore, according to the present embodiment, there can be obtained ultrapure water having a TOC density of not higher than 0.5 ppb and a low electrical conductivity capable of manufacturing semiconductor devices of a degree of integration higher than that of 64 Mbit-DRAM can be obtained.

A concrete example of the production of ultrapure water by means of an ultrapure water producing system employing an electric deionization unit in the primary pure water producing unit will be described next. In this case, the ultrapure water producing system used here was an ultrapure water producing system having a construction identical to that of the ultrapure water producing system shown in FIG. 9, in which the capacity of the first water tank 171 was set to about 1300 m$^3$, the capacity of the second water tank 174 was set to 100 m$^3$, the capacity of the circulation use activated carbon tower 172 was set to 15 m$^3$ and the capacity of the water conveyance use activated carbon tower 173 was set to 15 m$^3$.

By using this ultrapure water producing system, water to be treated having an electrical conductivity of 186 μs/cm and a TOC density of 2.2 ppm was subjected to pretreatment. As a result, the water to be treated from the second water tank 174 was able to have an electrical conductivity of 148 μs/cm and a TOC density of 0.3 ppm. Then, this water to be treated was introduced into the primary pure water producing unit 175 having the electric deionization unit 189 and the secondary pure water producing unit 176 for the production of ultrapure water, there was able to be obtained ultrapure water having a TOC density of not higher than 0.5 ppb from the secondary pure water producing unit 176.

Figure 19:
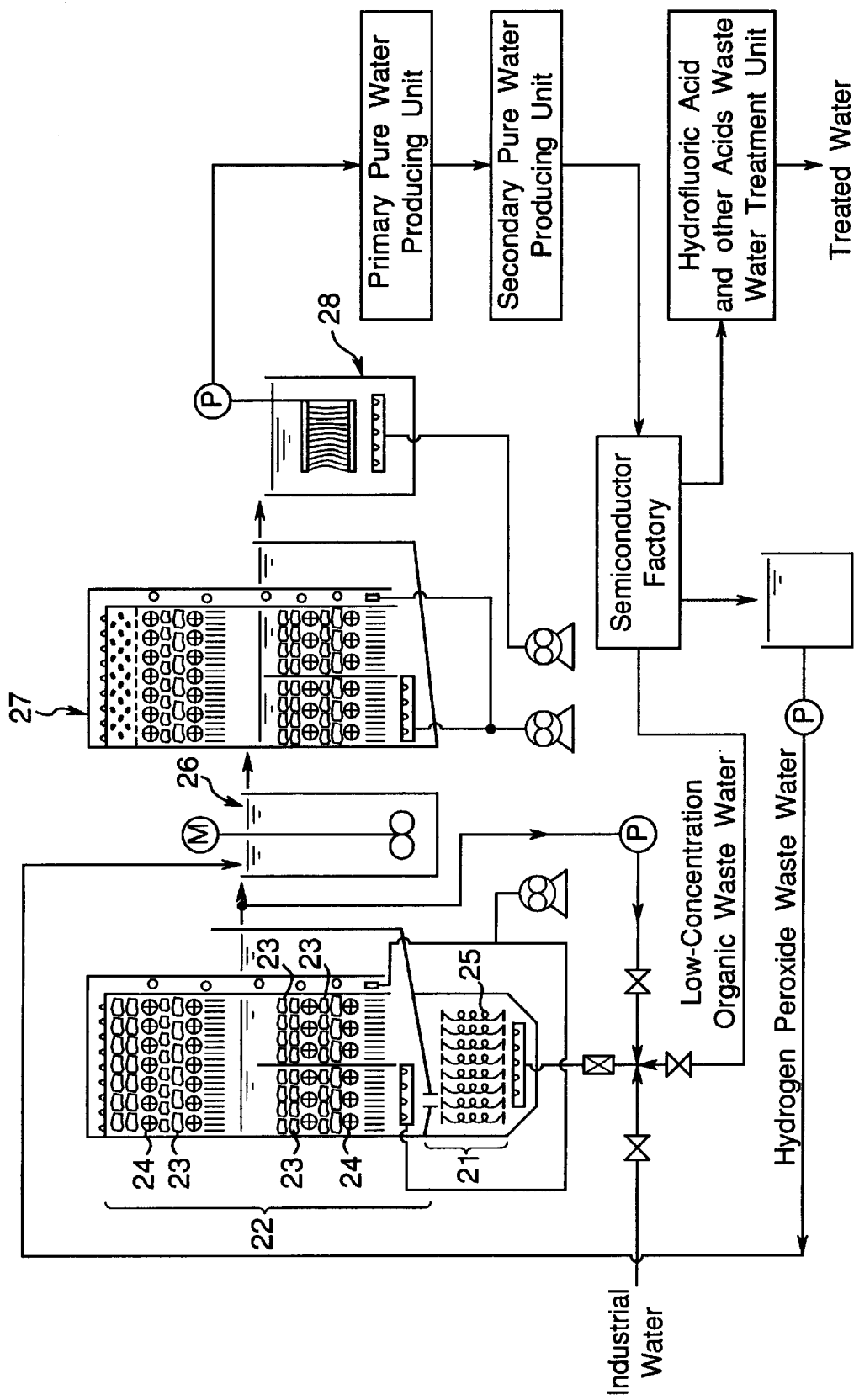
FIG. 19 is a schematic view of a prior art ultrapure water producing system utilizing a biotic treatment with an anaerobic microbe and an aerobic microbe in its pretreatment unit different from that of FIG. 18.

In the case of the pretreatment unit utilizing biotic treatment with the anaerobic microbe and the aerobic microbe in the prior art ultrapure water producing system shown in FIG. 19, the TOC density of the water to be treated is merely allowed to be about 1.2 ppm. However, in the pretreatment unit of the ultrapure water producing system shown in FIG. 9 (eighth embodiment), the TOC density can be 0.3 ppm, so that treated water appropriate for the introduction thereof into the electric deionization unit 189 can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ultrapure water producing system having a raw water pretreatment unit, a primary pure water producing unit and a secondary pure water producing unit, the pretreatment unit comprising:

an anaerobic organic matter treatment chamber and an aerobic organic matter treatment chamber which are formed by separating a water tank by a partition wall and have their bottom portions communicated with each other, the raw water being introduced into the anaerobic organic matter treatment chamber, the anaerobic organic matter treatment chamber being provided with an underwater stirring means for forming a circulating flow in the water to be treated and stowed with retention carriers of an anaerobic microbe in a downward flow region of the circulating flow, and the aerobic organic matter treatment chamber being provided with aerating means for forming a circulating flow in the water to be treated and stowed with retention carriers of an aerobic microbe in the downward flow region of the circulating flow.

2. An ultrapure water producing system as claimed in claim 1, wherein
the retention carriers are activated carbon and charcoal.

3. An ultrapure water producing system as claimed in claim 2, wherein the charcoal is Bincho charcoal.

4. An ultrapure water producing system as claimed in claim 2, wherein
the activated carbon is put in a bag and stacked on the charcoal,
tubular nets are arranged in a vertical direction in a region in which the charcoal is stowed, and
the charcoal is stowed between the tubular nets.

5. An ultrapure water producing system as claimed in claim 2, wherein
the activated carbon is a biotic activated carbon where a microbe is propagating, and
the charcoal is a biotic activated charcoal where a microbe is propagating.

6. An ultrapure water producing system as claimed in claim 1, wherein
a low-concentration organic waste water from a semiconductor factory is introduced into the anaerobic organic matter treatment chamber.

7. An ultrapure water producing system as claimed in claim 1, wherein
the water tank is a water receiving tank of raw water.

8. An ultrapure water producing system as claimed in claim 1, wherein
the pretreatment unit has an activated carbon tower which is stowed with the activated carbon and treats the water to be treated from the anaerobic organic matter treatment chamber.

9. An ultrapure water producing system as claimed in claim 8, wherein
the activated carbon tower is constructed of a first activated carbon tower for performing a treatment comprised principally of a biotic treatment and a second activated carbon tower for performing a treatment comprised principally of a physical treatment.

10. An ultrapure water producing system as claimed in claim 9, wherein
the first activated carbon tower is the first activated carbon tower which treats the water to be treated from the aerobic organic matter treatment chamber and conveys the resulting water back to the anaerobic organic matter treatment chamber, and
the second activated carbon tower is the second activated carbon tower which treats the water to be treated from the aerobic organic matter treatment chamber and conveys the resulting water to the primary pure water producing unit.

11. An ultrapure water producing system as claimed in claim 10, wherein
the primary pure water producing unit includes an electric deionization unit.

12. An ultrapure water producing system as claimed in claim 11, comprising:
a first back washing drain pipe whose one end is connected to an upper portion of the anaerobic organic matter treatment chamber;
a second back washing drain pipe whose one end is connected to an upper portion of the aerobic organic matter treatment chamber;
a back washing blower; and
an air diffusion pipe which is installed just below the retention carrier of the anaerobic microbe and the retention carrier of the aerobic microbe and diffuses air from the back washing blower.

13. An ultrapure water producing system as claimed in claim 11, wherein
concentrated water including concentrated ions from the electric deionization unit is introduced into the anaerobic organic matter treatment chamber.

14. An ultrapure water producing system as claimed in claim 11, comprising:
an auxiliary electric deionization unit into which the, concentrated water from the electric deionization unit is introduced, for performing a deionizing treatment on the concentrated water,
the water to be treated from the auxiliary electric deionization unit being introduced into the anaerobic organic matter treatment chamber.

15. An ultrapure water producing system as claimed in claim 11, comprising:
an auxiliary electric deionization unit into which the concentrated water from the electric deionization unit is introduced, for performing a deionizing treatment on the concentrated water; and
a treatment water tank which receives the water to be treated from the auxiliary electric deionization unit together with the water to be treated from the second activated carbon tower.

16. An ultrapure water producing system as claimed in claim 10, comprising:
circulating means for circulating the water to be treated through the anaerobic organic matter treatment chamber, the aerobic organic matter treatment chamber and the first activated carbon tower.

17. An ultrapure water producing system as claimed in claim 16, comprising:
a TOC meter which measures a TOC density of the water to be treated from the second activated carbon tower and outputs a signal representing the measured TOC density; and
a TOC control means which controls at least one or a combination of a rotating speed of the underwater stirring means, a rate of aeration of the aerating means and a rate of circulation of the circulating means based on the signal from the TOC meter.

* * * * *